(12) United States Patent
Lindner

(10) Patent No.: US 10,981,212 B2
(45) Date of Patent: Apr. 20, 2021

(54) METHOD FOR JOINING A FUNCTIONAL MODULE, AND FUNCTIONAL MODULE

(71) Applicant: Linamar GmbH, Crimmitschau (DE)

(72) Inventor: Mario Lindner, Chemnitz (DE)

(73) Assignee: LINAMAR GmbH, Crimmitschau (DE)

( * ) Notice: Subject to any disclaimer, the term of this patent is extended or adjusted under 35 U.S.C. 154(b) by 373 days.

(21) Appl. No.: 15/654,140

(22) Filed: Jul. 19, 2017

(65) Prior Publication Data

US 2017/0312804 A1    Nov. 2, 2017

Related U.S. Application Data

(63) Continuation of application No. PCT/EP2016/051323, filed on Jan. 22, 2016.

(30) Foreign Application Priority Data

Jan. 23, 2015  (DE) ..................... 10 2015 101 004.6

(51) Int. Cl.
*B23P 11/00*     (2006.01)
*F01L 1/047*     (2006.01)
(Continued)

(52) U.S. Cl.
CPC ......... *B21D 53/845* (2013.01); *B21D 26/033* (2013.01); *B23P 11/005* (2013.01);
(Continued)

(58) Field of Classification Search
CPC .... B21D 53/845; B21D 26/033; B21D 39/00; B21D 39/203; F01L 1/053; F01L 1/047;
(Continued)

(56) References Cited

U.S. PATENT DOCUMENTS 3,445,908 A * 5/1969 Straub ................... F16C 23/045
                                                      29/898.07
4,750,250 A * 6/1988 Maus ................... B21D 39/203
                                                      29/888.1
(Continued)

FOREIGN PATENT DOCUMENTS

CN        88103053 A    12/1988
CN         1181799 A     5/1998
(Continued)

OTHER PUBLICATIONS

International Preliminary Report on Patentability for International Application PCT/EP2016/051323, dated Aug. 3, 2017.
(Continued)

*Primary Examiner* — Lee A Holly
(74) *Attorney, Agent, or Firm* — Jason H. Vick; Sheridan Ross, PC

(57) ABSTRACT

A method of joining a functional module comprises the steps of providing a frame structure that defines a bearing channel with at least one circumferentially closed bearing seat; providing at least two attachment parts; providing a hollow shaft that comprises at least one support section for the at least two attachment parts, wherein the attachment parts comprise a mounting seat that is adapted to a support section; feeding the attachment parts in the bearing channel in a first feeding direction; feeding the hollow shaft in the bearing channel in a second feeding direction, wherein the hollow shaft is inserted into the respective mounting seat of the at least two attachment parts; and, subsequent to the feeding of the attachment parts and the hollow shaft in the bearing channel, at least sectionally widening the hollow shaft for a torsionally rigid fixation of the at least two attachment parts with their mounting seats at the respective support section of the hollow shaft.

16 Claims, 6 Drawing Sheets

(51) Int. Cl.
B21D 53/84 (2006.01)
B21D 26/033 (2011.01)
F01L 1/053 (2006.01)

(52) U.S. Cl.
CPC ............... F01L 1/047 (2013.01); F01L 1/053 (2013.01); *B23P 2700/02* (2013.01); *F01L 2001/0471* (2013.01); *F01L 2001/0473* (2013.01); *F01L 2001/0475* (2013.01); *F01L 2001/0476* (2013.01); *F01L 2001/054* (2013.01); *F01L 2001/0537* (2013.01)

(58) Field of Classification Search
CPC ....... F01L 2001/0471; F01L 2001/0537; F01L 2001/054; F01L 2001/0475; F01L 2001/0473; F01L 2001/0476; B23P 11/005; B23P 2700/02; F16C 23/045
See application file for complete search history.

(56) References Cited

U.S. PATENT DOCUMENTS

| | | | |
|---|---|---|---|
| 5,004,370 | A | 4/1991 | Swars |
| 6,192,582 | B1 | 2/2001 | Swars |
| 7,992,533 | B2 * | 8/2011 | Vogel ..................... B24B 19/12 123/90.6 |
| 9,981,304 | B2 | 5/2018 | Wiesner |
| 10,046,425 | B2 * | 8/2018 | Walter ..................... F01L 1/047 |
| 2003/0150095 | A1 | 8/2003 | Asbeck et al. |
| 2008/0222889 | A1 * | 9/2008 | Asbeck ................ B21D 53/845 29/888.1 |
| 2010/0224145 | A1 * | 9/2010 | Mueller .................. F01L 1/047 123/90.1 |
| 2011/0308487 | A1 | 12/2011 | Furchheim |
| 2013/0283613 | A1 | 10/2013 | Walter et al. |
| 2014/0174248 | A1 | 6/2014 | Paul et al. |
| 2015/0075457 | A1 | 3/2015 | Menonna et al. |
| 2015/0192040 | A1 | 7/2015 | Schuler et al. |
| 2015/0251238 | A1 * | 9/2015 | Wiesner ................. B21D 39/00 29/888.1 |
| 2016/0346880 | A1 * | 12/2016 | Schmid .................. F01L 1/053 |

FOREIGN PATENT DOCUMENTS

| | | |
|---|---|---|
| DE | 3227693 A1 | 1/1984 |
| DE | 4221962 A1 | 1/1994 |
| DE | 10024768 A1 | 11/2001 |
| DE | 10234368 C1 | 9/2003 |
| DE | 10225688 A1 | 12/2003 |
| DE | 102009043162 B3 | 9/2010 |
| DE | 102010045047 | 3/2012 |
| DE | 102011011501 A1 | 8/2012 |
| DE | 102011050930 A1 | 12/2012 |
| DE | 102011104480 A1 | 12/2012 |
| DE | 102012015991 A1 | 1/2013 |
| DE | 102011117849 A1 | 5/2013 |
| DE | 102012206499 A1 | 10/2013 |
| DE | 102012016357 A1 | 2/2014 |
| DE | 102013107284 A1 | 4/2014 |
| EP | 0265663 A1 | 5/1988 |
| EP | 1155770 A2 | 11/2001 |
| EP | 1334784 A2 | 8/2003 |
| EP | 1936131 A1 | 6/2008 |
| EP | 1970140 A1 | 9/2008 |
| WO | WO 2014/067860 | 5/2014 |

OTHER PUBLICATIONS

Office Action (Including Translation) for corresponding Chinese Patent Application No. 201680006756.4, dated Jul. 2, 2019.
International Search Report for International Application PCT/EP2016/051323, dated Mar. 30, 2016.
Written Opinion for International Application PCT/EP2016/051323, dated Mar. 30, 2016.
Office Action for corresponding German Application No. 10 2015 101 004.6, dated Nov. 16, 2015.
Office Action for corresponding Chinese Patent Application No. 201680006756.4, dated Nov. 2, 2018.
Office Action for corresponding European Application No. 16701332.5, dated Jun. 10, 2020.

* cited by examiner

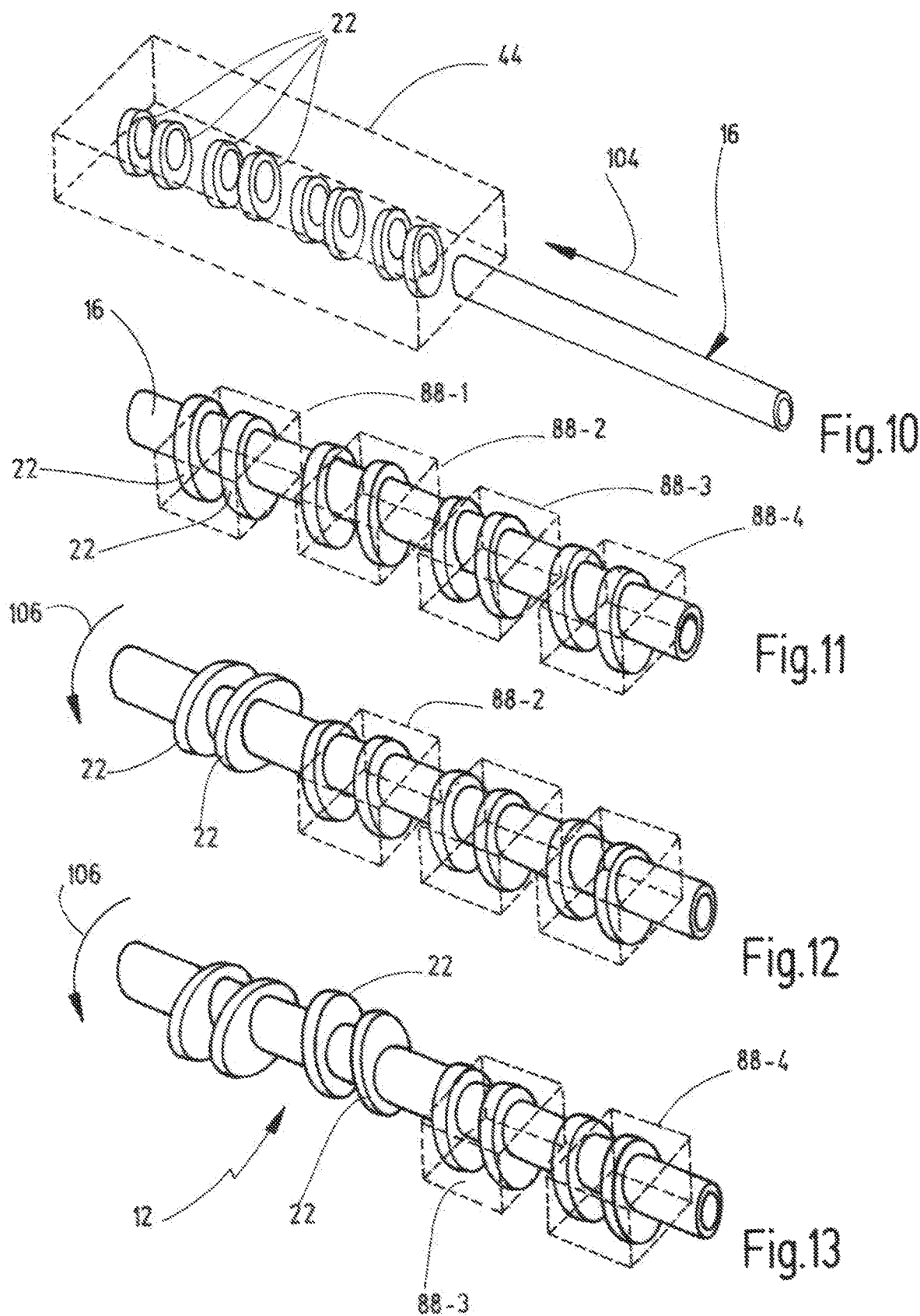

METHOD FOR JOINING A FUNCTIONAL MODULE, AND FUNCTIONAL MODULE

CROSS-REFERENCES TO RELATED APPLICATIONS

This application is a continuation of International Patent Application PCT/EP2016/051323, filed on Jan. 22, 2016 designating the U.S., which international patent application has been published in German language and claims priority from German patent application 10 2015 101 004.6, filed on Jan. 23, 2015. The entire content of that priority application is fully incorporated by reference herewith.

BACKGROUND

The disclosure relates to a method of joining a functional module, comprising a frame structure, that defines at least one bearing channel, and at least one assembled composite shaft that comprises a hollow shaft and attachment parts fixed thereto in a torque-proof fashion, and that is mounted to the frame structure.

The disclosure further relates to a functional module of that kind that may be arranged as a camp shaft module, cylinder head module, mass balance module, or in a similar fashion.

A similar method is known from US 2013/0283613 A1. The known method serves for the purpose of assembling a module for a vehicle engine, comprising at least one cylinder head hood having bearing supports, and a cam shaft that is mounted in the bearing supports, wherein the cam shaft is assembled from a support shaft and components to be connected with the support shaft when the module is assembled, and wherein the components comprise through-holes for receiving the support shaft. Further, the components that are to be attached to the support shaft are positioned in a predefined order in the cylinder head hood in such a way that through-holes of the components are arranged in a fashion aligned with respect to the bearing supports of the cylinder head hood. The support shaft is fed in an axial direction, wherein the support shaft is pressed-in with the components, wherein the pressing-in is performed based on thermal joining, wherein the support shaft is cooled down, and wherein the components to be attached thereto are heated.

The known method is insofar beneficial as so-called "closed" not-separated cylinder head modules having respective non-separated bearing support may be equipped with cam shafts. This enables an integral design of the cylinder head hood and reduces in particular manufacturing costs and assembly costs which cannot be avoided with multiple-component cylinder head hoods. However, it has been observed that the joining process on which US Published Application No. 2013/0283613 is based is subject to technological limits. Generally, a press fit joint requires a defined axial and/or radial interference between the components that are to be jointed with one another to attach the component to be mounted, for instance the cam, highly accurate in the desired axial position, angular position and particularly in a fashion suitable for a rotational drive. Particularly with components that are at least partially used for torque transmission, for instance with gear wheels, cams, belt pulleys and such like it has to be ensured that no relative rotation between the components and the support shaft may occur when the cam shaft is operated. Failures of this kind may namely result in considerable damages at the cylinder head and, as the case may be, even to a total loss of the engine.

Hence, when designing a cam shaft that is to be pressed-in thermally on the one hand, a necessary assembly fit has to be observed that in the first place enables the pressing-in as such. Further, the interference between the components that (theoretically) remains subsequent to the pressing-in that enables the positional fixing has to be ensured. The thermal joining here utilized the effect that the used materials, particularly metal materials, are subject to a certain thermal expansion. Hence, for instance an assembly diameter of the support shaft may be reduced by cooling-down. Further, an assembly diameter of the components that are to be attached thereon, may be increased by heating. However, temperature limits have to be observed. An excessive heating of the components to be attached may have a negative impact on the characteristics thereof, for instance resulting in a hardness loss or even in changes in structure. Similarly, also an excessive cooling-down of the support shaft may have a negative impact.

In regard of the cooling-down there are further limits to be observed that are inherent in the economically reasonable utilizable cooling procedures. For instance, components may be cooled-down with liquid nitrogen to about −176° (degrees Celsius). Hence, on the one hand, the assembly clearance may not be arbitrarily large, and, on the other hand, also the (theoretical) interference of the components at room temperature may not be arbitrarily large. This may be, on the one hand, problematic for assembly as the acquired accuracy is increased the smaller the assembly clearance is. On the other hand, an only relatively small interference subsequent to the joining may have a negative impact on the functional safety of the cam shaft.

In view of this, it is an object of the present disclosure to present alternative processes for joining composite shafts and functional modules that are provided with composite shafts.

It is a further object of the present disclosure to present assembly and joining methods that are well-suited for functional modules having non-separated housings and/or non-separated bearing channels, and that may hence enable the forming of integrally shaped functional modules.

It is a further object of the present disclosure to present methods that may contribute to a reduction in manufacturing costs, for instance a reduction in assembly costs.

It is a further object of the present disclosure to present an assembly method that contributes to an increase in process reliability.

It is a further object of the present disclosure to present assembly methods that enable the manufacture of functional modules comprising assembled cam shafts that are equipped with attachment parts that are arranged for rotary driving and that are arranged to transmit torques that are be present in the operation of the functional module, at a great functional reliability and failure safety.

It is a further object of the present disclosure to present an assembly method that enables a reduction of the utilization of auxiliary materials and operating materials, and of the energy consumption involved in the joining of the functional module.

It is a further object of the present disclosure to present a method enables a joining of the functional module at room temperature.

It is a further object of the present disclosure to present a functional module and a composite shaft for a functional module that may be manufactured in accordance with at least some exemplary principles of the method.

SUMMARY

In regard of the manufacture of a composite shaft, these and other objects of the disclosure are achieved by a method of joining an assembled composite shaft that comprises a hollow shaft having attachment parts fixed thereto in a torque-proof fashion, wherein the method involves the following steps:
- providing at least one attachment part, for instance a plurality of attachment parts,
- providing a hollow shaft that comprises at least one support section for the at least one attachment part, wherein the attachment part comprises a mounting seat that is adapted to the support section,
- feeding the at least one attachment part,
- feeding the hollow shaft, wherein the hollow shaft is inserted into the respective mounting seat of the at least one attachment part, and
- subsequent to the feeding of the attachment parts and the hollow shaft, at least sectionally the widening the hollow shaft for fixing the at least one attachment part with its mounting seat at the respective support section of the hollow shaft,
- wherein the hollow shaft is plastically deformed in the region of its support sections, wherein at least one attachment part of the at least one attachment part is elastically deformed.

The attachment parts may involve, for instance, at least partially, roller bearings, cams, gear wheels, and such like. An effect of the above method is that attachment parts are joined by widening with only a small need of post-processing and/or even without the need of any post-processing. Processes that are used in the prior art require regularly an excessive post-processing to meet desired dimensions and tolerances. In accordance with the above method, for instance a finishing machining may be dispensed with.

An exemplary embodiment of the above method involves the joining of bearings, for instance of roller bearings that are provided with roller elements. Commonly, roller bearings comprise an inner ring, an outer ring, and a plurality of rolling elements that are disposed between the inner ring and the outer ring.

Then the hollow shaft is sectionally widened, the hollow shaft may be joined with the inner ring of the roller bearing. Accordingly, at the bearing, primarily the inner ring is elastically deformed, namely elastically widened. This may be considered when designing the roller bearing and/or the joining process. By way of example, bearings may be used that deliberately comprise a defined radial play between the inner rings, the outer rings and the tolling elements disposed therebetween. In other words, for instance, the inner ring deliberately comprises a diameter that is slightly too small. Subsequent to the widening, the inner ring is deformed so that the diameter meets the desired finished dimension, and the desired accuracy and/or the necessary bearing play is ensured.

An alternative embodiment relates to the assembling or joining of an at least partially integrated roller bearing. In accordance with this embodiment, the inner ring and/or the inner section of the roller bearing are directly formed at the hollow shaft and/or integrated therein. This may involve a surface treatment, for instance a processing of a running surface. Further, this may involve the formation of a bearing groove or similar design elements at the hollow shaft. When widening the hollow shaft, also this section is widened and at least partially elastically deformed. This may effectuate a positional securing of the roller elements and the outer ring at the hollow shaft to form the integrally formed roller bearing.

Generally, the joining of the attachment parts at the hollow shaft in accordance with the above aspects is also suitable for functional modules, wherein a joining of the composite shaft in a pre-assembled state is not necessarily required. An effect of this embodiment is the reduction or even the prevention of post-processing and/or finishing processing to form final contours of the attachment parts.

In regard of the manufacture of a functional module, these and other objects of the disclosure are achieved by a method for joining a functional module, comprising a frame structure that defines at least one bearing channel, and at least one assembled composite shaft that comprises a hollow shaft and attachment parts fixed thereto in a torque-proof fashion, and that is mounted to a frame structure, wherein the method comprises the following steps:
- providing a frame structure, for instance a bearing frame or housing, that defines a bearing channel having at least one circumferentially closed bearing seat,
- providing at least two attachment parts, for instance a plurality of attachment parts,
- providing a hollow shaft that comprises at least one support section for the attachment parts, wherein the attachment parts comprise a mounting seat that is adapted to the support section,
- feeding the attachment parts in the bearing channel in a first feeding direction,
- feeding the hollow shaft in the bearing channel in a second feeding direction that is different from the first feeding direction, wherein the hollow shaft is inserted in the respective mounting seat of the at least two attachment parts, and
- subsequent to the feeding of the attachment parts and the hollow shaft in the bearing channel, at least sectionally widening of the hollow shaft for torsionally rigid fixation of the at least two attachment parts with their mounting seats at the respective support section of the hollow shaft, wherein the hollow shaft is plastically deformed in the region of its support sections, and wherein at least some of the at least two attachment parts are elastically deformed.

In accordance with some exemplary embodiments of the present disclosure, drawbacks that are inherent in the thermal joining may namely be avoided, as the hollow shaft which may also be referred to as support shaft is (plastically) deformed in a pre-assembled state to fix the attachment parts to be attached thereto in a loss-proof fashion and a fashion suitable for torque transmission.

A further effect is that the hollow shaft may be equipped with attachment parts that are actually too large for the bearing seats of the frame structure, to be fed therethrough in the axial direction. Hence, when designing the bearing seats, no certain consideration of the dimensions of the attachment part is necessary.

The widening of the hollow shaft may be performed in such a way that the hollow shaft is plastically radially widened in regions that are arranged within the attachment parts due to an internal pressure application so that the attachment parts are fixed to the hollow shaft in a stable pressure fit. In this context, by way of example, reference is made to US 2003/0150095 A1 which relates to the so-called internal high pressure forming of tubular components, for instance of hollow shafts. Internal high pressure forming methods are generally referred to as hydroforming methods. Hydroforming assembly methods differ significantly from joining methods that are generally based on a press fit and/or interference fit of involved joining components and that involve a joining utilizing thermal expansion and/or deformation of great pressure forces.

An effect of the joining method is that the assembly of the attachment parts and the hollow shaft may be basically formed in a single step. In for instance, it not required to apply a thermal processing to the elements to be joined and, additionally, to attach them to one another by pressing in. Ideally, in a state where the attachment parts and the hollow shaft are not yet fixed to one another by pressing in, a sufficiently great assembly play is provided that enables an aligning and a pre-assembling of the elements without considerable assembly forces.

A further advantage of widening the hollow shaft for forming the press fit is that basically great overlaps may be achieved that may form a heavy duty assembly. With methods that involve a thermal joining often further measures are required, for instance to increase friction parameters between the components to be assembled. Applications are known, wherein only in this way the desired load capacity and strength of the joint may be generated. Measures of that kind may require further machining procedures for assembly methods that are based on the thermal expansion of the mating components to be joined, for instance the generation of structures that increase the friction coefficient and/or respective coatings.

By contrast, joining based on a plastic widening of the hollow shaft enables heavy duty joints. This may have the result that, compared to known thermal joining methods, attachment parts having a smaller width may be used. Commonly, attachment parts that are designed for the thermal joining have to comprise a minimum width (axial extension) to be able to provide the desired torque transmission. With hydroforming based methods, this may already be achieved due to the potentially greater overlap so that a respective reduction of width is possible. This may contribute to a weight reduction of the composite shaft, for instance.

As used herein in the present disclosure, the term hollow shaft involves support shafts that are provided with a continuous recess, i.e. that are arranged to be continuously "hollow". Further, the term hollow shaft shall be construed to involve also support shafts that are at least sectionally provided with a hollow profile and/or a respective recess. In other words, in the context of this disclosure, also support shafts that comprise partially closed profile sections may be referred to as hollow shafts. However, the hollow shaft is entirely tubular in certain embodiments.

In some embodiments, the hollow shaft comprises, prior to the widening, a uniform hollow profile or annular profile extending therethrough so that basically no diameter deviations, i.e. for instance no steps and such like, are present along the longitudinal extension of the hollow shaft. However, it is conceivable that the hollow shaft is at least sectionally provided with a tapering, insertions, grooves and such like. However, there are also arrangements conceivable, wherein the hollow shaft is stepped at least at its outer circumference.

In some embodiments, the frame structure involves a frame structure that is manufactured from a single piece or that is at least integrally manufactured. In other words, the frame structure is non-separated in certain embodiments, i.e. not assembled from two or more elements (frame half parts). Accordingly, the circumferentially closed bearing seat may for instance involve a bearing seat having a single circumferential mating surface for a bearing. In other words, the bearing channel of the frame structure for the hollow shaft is not radially accessible. The hollow shaft may thus only be axially inserted into the bearing channel. The bearing channel of the frame structure is generally defined by a plurality of bearing seats that are oriented to be aligned with one another (concentrically positioned).

The torsionally rigid fixation of the attachment parts at the hollow shaft enables, in certain embodiments, a torque transmission between the hollow shaft and the attachment parts. In other words, the attachment parts are mounted at the hollow shaft in a rotation-proof fashion.

In accordance with an exemplary embodiment, the elastically deformed attachment parts comprise, subsequent to the widening of the hollow shaft, a final contour that may be free from post-processing, and that is provided with an outer circumference that comprises an actual dimension that corresponds to a target dimension of the outer circumference that is functionally specified. This has the effect that the composite shaft that is assembled with the frame structure, for instance in the housing, does not have to undergo a further material-removing machining. A post-processing of that kind would involve a significantly increased effort as the composite shaft is already "assembled". This would be attributable to the poor accessibility of the composite shaft and/or of the attachment parts, and to the contamination of the functional module that is associated with the post-processing, inter alia.

According to a further embodiment, the elastically deformed attachment parts are, subsequent to the widening of the hollow shaft, pressed in with their support sections under preloading, wherein the attachment parts comprise, prior to the widening of the hollow shaft, an outer contour that is smaller than a target outer contour that is functionally specified, and wherein the elastically deformed attachment parts comprise, subsequent to the widening of the hollow shaft, an actual outer contour that corresponds to a target outer contour that is functionally specified. In other words, the remaining elastic deformation of the attachment part may be predicted and can be made available at the attachment part in the non-joined state. This has the effect that the attachment parts comprise the desired dimensions subsequent to the widening of the hollow shaft. The necessary outer contour of the attachment parts prior to the joining, may be determined by means of calculations, simulations and/or tests.

According to a further embodiment, at least some of the attachment parts are provided, prior to the widening of the hollow shaft, at their outer contour, with functional surfaces, for instance with circumferential running surfaces having finished surfaces. It should be noted again in this context that a substantial effect of the method is that no material-removing post-processing of the joined attachment parts is necessary. Despite of a change of the dimensions of the outer contour of the attachment parts due to the widening of the hollow shaft, the surface quality is basically maintained. This is based for instance on the relatively small deformation. If the attachment parts, however, would be joined in accordance with generally known methods for joining by means of internal high pressure forming, a machining post-processing for forming the desired surface quality would be necessary. This would significantly increase the involved effort and costs.

According to a further embodiment, the attachment parts, prior to the widening of the hollow shaft, are finished at their outer contour by means of material-removing machining processes and provided with dimensions that are defined in consideration of the elastic deformation that remains subsequent to the widening of the hollow shaft. The attachment parts may thus deliberately manufacture to be slightly "too small" to be accurate in size subsequent to the widening.

According to a further embodiment of the method, the step of feeding the attachment parts further comprises the following:
    adjusting the attachment parts, wherein at least two of the attachment parts are oriented in a target-joining orientation that forms a relative orientation between the attachment parts that differs from a target orientation of the attachment parts with respect to one another in the joined state.

This may for instance involve that some or all of the attachment parts that are shaped as cams have the same target-joining orientation. This may greatly simplify handling and feeding the attachment parts. Further, the orientation of the attachment parts may be simplified as for instance the effort for providing appropriate positioning mounts is reduced.

According to a further embodiment, subsequent to the feeding of the hollow shaft in the bearing channel, the method comprises the following:
    axially aligning the hollow shaft,
    adjusting the angular position of the hollow shaft relative to at least one attachment part, and
    sectionally widening the hollow shaft for a torsionally rigid fixation of the at least one attachment part at the associated support section of the hollow shaft.

This has the effect that the angular orientation of the attachment parts with respect to one another may be mediately defined by the orientation of the hollow shaft. A plurality of the attachment parts may therefore have the same target joining orientation, subsequent to the feeding, even though in the finally joined state they have a target orientation deviating therefrom.

According to a further embodiment the method further comprises a sequential execution of the following steps for a plurality of attachment parts:
    adjusting the angular position of the hollow shaft relative to at least a further attachment part,
    widening a further support section of the hollow shaft for a torsionally rigid fixation of the at least one further attachment part,
    wherein a desired relative position, for instance a desired relative angular position (orientation) between the attachment parts, is achieved by the sequential adjustment and widening.

Hence, a sequential joining may be realized. Further, each attachment part may comprise the desired angular orientation in the assembled state, by respectively orienting the hollow shaft prior to the respective joining operation. A further potential effect of the sequential joining is that the joining pressure may be again adapted at each execution. Hence, it may be defined how strong the respective section of the hollow shaft is to be widened. The (imaginary) overlap that is present subsequent to the joining between the support section and the attachment part may be varied. In this way, joining forces and/or retaining forces may be influenced. For instance, it may be necessary for attachment parts that are arranged as cams, to define huge retaining forces to reliably prevent a rotation or slipping out of position of the cams. Other attachment parts, for instance sensor wheels made from sintered metal or similar materials having a reduced strength and/or elasticity may require a joining by widening at a reduced joining pressure, to avoid damages at the attachment parts.

Generally, the required assembly pressure at which a support section is widened may be dependent on the function, the dimensions and/or the material of the attachment parts. The joining pressure may be referred to as the pressure at which the respective support sections of the hollow shaft are widened form the interior. Hence, this may be regarded as the pressure of the Fluid by means of which the inner sides of the support sections are biased from the interior.

It goes without saying that the sequential joining may involve a separate joining of each attachment part. In the alternative, it is conceivable, at least at some executions, two jointly join a plurality of attachment parts. This may for instance relate to a pair of cams having an inlet cam and an outlet cam. Generally, attachment parts may be involved that are to be joined with the hollow shaft in an axially adjacent position.

Whenever a composite shaft is mentioned in the context of this disclosure, this shall be referred to as an assembly that consists of a plurality of elements, for instance from a support shaft and respective attachment parts. This does not necessarily involve that the elements of the composite shaft consist of different materials. Generally, the essential elements of the composite shaft are made from metal material, for instance from steel material.

In some embodiments, the functional module may be arranged as a pre-assembled cam shaft module that may involve, for instance a housing, respective bearings and a cam shaft mounted therein. The composite shaft, however, does not have to be necessarily formed as a cam shaft. It is also conceivable to arrange composite shaft as a balancing shaft, more generally as a control shaft or in a similar fashion, for instance.

In some embodiments, the functional module is arranged as an engine module, for instance as a cam shaft module or cylinder head module, wherein the composite shaft that is provided with the hollow shaft is arranged, in the joined state, as control shaft, for instance as cam shaft. Other applications may for instance involve control shafts for cam shaft adjustment, mass balance shafts, control shafts for injection systems and such like. In some embodiments, the composite shaft is directly or mediately associated with a valve drive, mass balance drive, or a crank drive of a combustion engine.

According to a further embodiment of the method, the attachment parts are selected from the group consisting of: cams, flanges, bearing bushings, pulse generators, gear wheels, spacer sleeves, and sprockets. In some embodiments, the hollow shaft is provided with a plurality of respective attachment parts that may correspond to several ones of the afore-mentioned types. Generally, for instance a cam shaft comprises a plurality of cam pairs (inlet cams, outlet cams). Further, commonly at least a gear wheel or sprocket for driving the cam shaft is provided. For detecting a rotation position of the cam shaft, for instance pulse generators or similar rotary encoders may be attached. Of course, also other attachment parts are conceivable.

It is noted in this context that not necessarily each attachment part that is attached to the hollow shaft has to be joined with the hollow shaft by plastically widening the hollow shaft. By way of example, attachment parts are conceivable that are not utilized for torque transmission. This may involve, for instance, spacer sleeves, inner rings of bearings, and similar components. It is therefore conceivable that at least some attachment parts are simply pressed-on at the hollow shaft. In some embodiments, at least cams, gear wheels and similar attachment parts that are arranged for torque transmission, are fixed to the hollow shaft by plastic widening.

According to a further embodiment, the method further comprises, prior to feeding the attachment parts and the hollow shaft to the frame structure, the step of machining at least one support section of the hollow shaft or the associated mounting seat of the attachment part for forming a defined assembly clearance between the hollow shaft and the attachment parts. In some embodiments, both the support section and the associated mounting seat are machined. Ideally, this involves that also an outer diameter of the hollow shaft and an inner diameter of the attachment part are adapted to one another in such a way that a defined assembly gap is present that enables a sufficiently large assembly clearance to enable a simple pre-assembly without a great exertion of force. This is for instance achieved by axially inserting the hollow shaft into the bearing channel, in which the attachment parts are already provided.

In some embodiments, the defined assembly clearance is selected to be significantly smaller than in hydroforming methods that are generally known in the prior art. In some embodiments, the assembly clearance may involve only a few per mille ($\%_0$) of the assembly diameter between the hollow shaft and the respective attachment part.

A relatively small mounting gap may involve several effects. An exemplary effect may be that, when the hollow shaft is widened, due to the small gap that is to be overcome for joining the hollow shaft with the attachment part, only an extremely small warpage at the hollow shaft and the attachment part is present. In this way, post-processing of the joint composite shaft may be dispensed with. As the joint composite shaft is already necessarily mounted in the frame structure, such a post-processing would involve great efforts.

Generally, a small defined assembly clearance enables a reliable joining of the hollow shaft with the attachment parts at a relatively small deformation degree of the hollow shaft. In this way, also an excessive brittleness of the hollow shaft may be prevented. A further effect may be seen in the small mounting gap that has to be surmounted when joining, and that may contribute to a state in which no massive counter-holder for the attachment parts is necessary that supports the attachment parts circumferentially. In other words, a resulting deformation at the circumference of the attachment part that is induced by the widening of the hollow shaft, may be predicted at a sufficiently precise level, and/or determined during the joining or immediately subsequent to the joining. The deformation to be expected is extremely small.

In this way, an in-process-monitoring or a nearly in-process-monitoring is enabled. This may be substantial, for instance for attachment parts that are arranged as cams, as respective impacts on the engine timing of combustion engines may have a substantial influence on the operational behavior of the engine. As, however, no massive counter-holder (matrix or die) for the respective attachment part is necessary, already during the widening, the outer contour, for instance the running surface, of the cams may be monitored. Accordingly, ideally, already during the widening, a feedback between the monitoring of the outer contour and the device used for the widening may occur. Accordingly, process parameters of the deformation procedure may be influenced dependent on the resulting outer contour of the cam.

In an exemplary embodiment, the assembly clearance between the hollow shaft and the attachment parts is maximally 150 μm (micrometers). In some embodiments, the assembly clearance is maximally 100 μm. In some embodiments, the assembly clearance is maximally 50 μm. By way of example, the support sections of the hollow shaft and the mounting seat of the attachment parts associated therewith, may be manufactured and machined in such a way that an assembly clearance in the range of between 20 μm to 75 μm is enabled. In some embodiments, the assembly clearance is in the range of between 30 μm to 50 μm.

Known hydroforming-methods, for instance according to US Publication No. 2003/0150095, are generally based on a substantially greater assembly gap that has to be surmounted by the deformation of the hollow shaft. This has the effect, on the one hand, that the joining procedure as such is simplified. Also an initial machining of the respective joining surfaces of the hollow shaft and the attachment part may be performed with reduced efforts and a reduced precision. However, this involves often the drawback that, subsequent to, the assembly procedure, post-processing is necessary, due to deformations and/or the warpage. The post-processing often involves even a straightening of the joint shaft as the deformations are per se too great. This is prevented in accordance with the present disclosure by a sufficiently accurate machining and the greatly reduced joining gap.

The hollow shaft is at least partially plastically deformed during the widening. This includes, in each case, a partially elastic deformation when the actual force (deformation force) is applied, wherein a plastic deformation remains when the deformation form does not further act on the hollow shaft. The remaining plastic deformation then deforms the respective attachment part. In some embodiments, the deformation of the attachment part is substantially elastic. The plastic widening of the hollow shaft thus causes a remaining elastic widening of the attachment part, for instance of the cams. In other words, the attachment part is, subsequent to the joining procedure, slightly greater at its circumference than prior to the joining. In some embodiments, the remaining widening is in the range of 25 μm to 75 μm. In some embodiments, the remaining widening is in the region of 40 μm to 60 μm. In some embodiments, the remaining widening is at about 50 μm, for instance.

This widening, however, may be considered and/or may be prepared prior to the joining. This widening may be determined and/or predicted by means of calculations, simulations and/or supplemental tests. In this way, the attachment part may be deliberately manufactured to be "too small", so that the desired dimensions and/or the desired shape is achieved subsequent to the joining and the associated elastic widening.

According to a further embodiment, the method further comprises, prior to feeding the hollow shaft to the frame structure, the step of machining, for instance of finishing machining, at least of a bearing section of the hollow shaft that is associated with a bearing seat of the bearing channel in the joint state. It is in other words beneficial that the hollow shaft is already before the inserting into the bearing channel completely machined so that subsequent to the insertion and the joining no further machining is necessary. This indeed increases the effort for the machining prior to the joining procedure to a certain extent, but, however, avoids subsequent processing procedures.

Ideally, the hollow shaft is continuously or substantially continuously provided with a uniform outer diameter. In this way, a plurality of attachment parts may be mounted at the hollow shaft. At least some of the attachment parts, for instance bearings and such like, which are not arranged for torque transmission, may be axially pressed-on. Other components that are arranged for torque transmission may be fixed by radially widening and pressing-on at the hollow shaft in a torque-proof fashion. It shall be understood that also a stepped arrangement of the hollow shaft is conceivable.

According to a further embodiment of the method, the at least one bearing section and the at least one support section of the hollow shaft are substantially similarly machined. In some embodiments, the at least one bearing section and the at least one support section have the same diameter. Ideally, this applies at least to adjacent support sections and bearing sections. This may further involve that the Machining of the bearing section and the support section is performed in such a way that both have the same nominal dimension and both have the same tolerance zone. Further, both may have the same surface roughness.

According to a further embodiment, the method further comprises the step of joining at least one bearing element that enables a relative rotation between the hollow shaft of the frame structure, for instance arranging at least one bearing element between a bearing section of the hollow shaft and an associated bearing seat of the bearing channel. The method may further involve also the step of machining, for instance finishing machining, of the at least one attachment part, prior to the feeding of the hollow shaft.

According to a further embodiment, the method further comprises the step:
non-axially feeding, preferably radially feeding the at least one attachment part in the bearing channel,
axially feeding the hollow shaft in the bearing channel, and
orienting the at least one attachment part in the bearing channel in a defined relative position.

To this end, for instance, a positioning support may be provided that determines the desired relative position of the attachment part with respect to the hollow shaft, for instance with respect to further attachment parts for the hollow shaft. The relative position may involve, on the one hand, an axial position of the attachment parts to one another, and relative to the hollow shaft. Further, the relative position may involve an Angular position of the attachment parts relative to one another, and relative to the hollow shaft.

According to a further embodiment of the method, the step of widening the hollow shaft further comprises:
inserting a lance shaped or mandrel shaped deformation tool into the hollow shaft, and
sequential or simultaneous widening of a plurality of support sections of the hollow shaft that are associated with respective attachment parts, wherein for instance the widening of at least one of the support sections is performed without counter-holding by means of an outer die.

These steps may be executed sequentially, wherein the hollow shaft is plastically widened in several sections that are associated with a single or a plurality of attachment parts. Accordingly, the joining procedure may be accomplished piece by piece. It is, however, also conceivable that the different support sections of the hollow shaft are simultaneously widened.

According to a further embodiment of the method, the widening of at least one of the support sections is performed without counter-holding by means of an outer die. As already indicated herein before, it is beneficial, that at least one of the attachment parts does not comprise a massive counterholder that is intended to control deformations at the attachment part that are resulting from the widening of the hollow shaft, for instance. In some embodiments, the widening of the hollow shaft is performed in such a way that only small deformations and/or widenings of the attachment part are involved. Provided that these deformations are sufficiently predictable, the attachment part may be designed in such a way that the desired final contour results subsequent to the widening of the hollow shaft at a high probability and with sufficiently narrow tolerances.

In the context of this disclosure, a matrix or a counterholder shall be referred to as a massive die that defines a resulting outer contour of the attachment part. Dies of that kind are often necessary with conventional hydroforming-methods. In some embodiments, the joining of the hollow shaft with the attachment parts is performed die-free or matrix-free.

According to a further embodiment, the method further comprises joining at least one bearing element that enables a relative rotation between the hollow shaft and the frame structure, between two support sections of the hollow shaft that are axially displaced from one another. In some embodiments the joining of the at least one bearing element is performed prior to the widening of the two adjacent support sections. The feeding of the bearing element may be basically also made in a radial direction. It is however also conceivable to feed bearing elements axially in the bearing channel as the bearing elements are generally adapted to bearing seats of the bearing channel. Also combined radial-axial feeding movements are conceivable.

The above-mentioned aspects of the method explicitly relate also to a composite shaft that is manufactured in accordance with the method, and that is mounted in a functional module, or arranged to be mounted therein.

In regard of the functional module, these and other objects of the disclosure are achieved by a functional module, for instance a cam shaft module, having a frame structure, that defines at least one bearing channel, and at least one assembled composite shaft that is mounted at the frame structure and that comprises a hollow shaft and attachment parts fixed thereto in a torque-proof fashion, wherein the frame structure comprises a radially closed bearing channel, for instance a bearing channel that is radially inaccessible for the hollow shaft, wherein the attachment parts comprise mounting seats that are adapted to a respective support section of the hollow shaft, wherein the support section of the hollow shaft is widened to fix the attachment part at the hollow shaft in a torsionally rigid fashion, wherein the hollow shaft is plastically deformed in the region of its support sections, and wherein at least some of the at least two attachment parts are elastically deformed and pressed-on with their support sections.

In some embodiments, the functional module is manufactured or joined in accordance with at least some aspects of the above described method. The support section is plastically widened, for instance.

According to a further refinement of the functional module, the bearing channel for the assembled composite shaft is axially inaccessible. This may involve, for instance, that at least one of the attachment parts that are fixed to the hollow shaft in a torsionally rigid fashion are simply "too large", to be guided through a bearing seat of the bearing channel, for instance.

According to a further embodiment of the functional module, at least one bearing element is provided that connects a bearing section of the hollow shaft and an associated bearing section of the frame structure, wherein the bearing element is arranged between two adjacent widened support sections at which respectively an attachment part is mounted in a torque-proof fashion.

In regard of the composite shaft, these and other objects of the disclosure are achieved by an assembled composite shaft, for instance a cam shaft that is arranged to be mounted at a frame structure that defines at least one bearing channel, wherein the composite shaft comprises a hollow shaft and attachment parts fixed thereto in a torque-proof fashion, wherein the attachment parts comprise mounting seats that are adapted to a respective support section of the hollow shaft, wherein the support section of the hollow shaft is widened to fix the respective attachment part torsionally rigid at the hollow shaft, wherein the hollow shaft is plastically deformed in the region of its support sections, and wherein at least some of the attachment parts are elastically deformed and pressed-on with their support sections.

It goes without saying that the scope of the of the present disclosure also involve embodiments and methods of composite shafts and/or functional modules, wherein only a single attachment part is joined with a hollow shaft by sectionally widening the hollow shaft.

It is to be understood that the previously mentioned features and the features mentioned in the following may not only be used in a certain combination, but also in other combinations or as isolated features without leaving the spirit and scope of the present disclosure.

BRIEF DESCRIPTION OF THE DRAWINGS

Further features and advantages of the disclosure are disclosed by the following description of a plurality of exemplary embodiments, with reference to the drawings, wherein:

FIGS. 10, 11, 12 and 13 schematic, greatly simplified perspective views of a composite shaft that is arranged as a cam shaft, for elucidating aspects of an exemplary joining procedure.

DETAILED DESCRIPTION OF EXEMPLARY EMBODIMENTS

Figure 1:
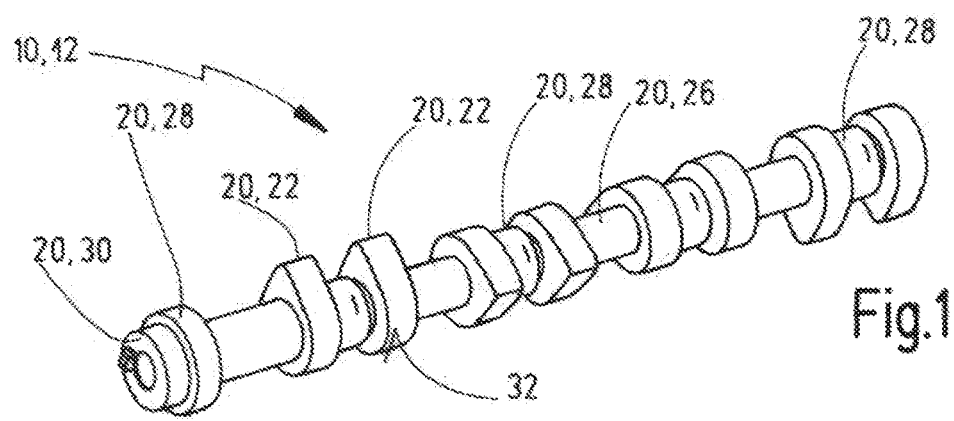
FIG. 1 is a perspective view of an assembled composite shaft that is arranged as a cam shaft.
Figure 2:
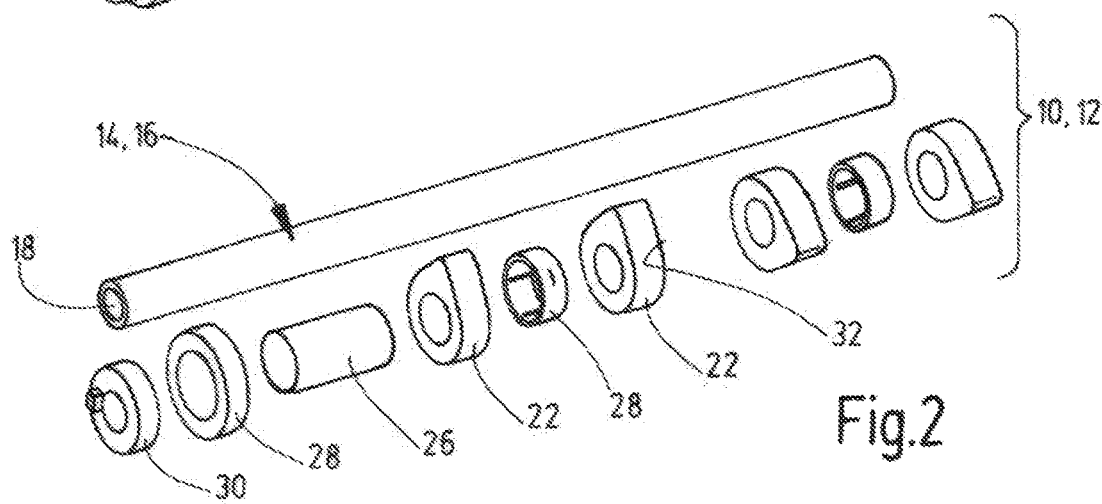
FIG. 2 is a schematic exploded view of the cam shaft according to FIG. 1.
Figure 3:
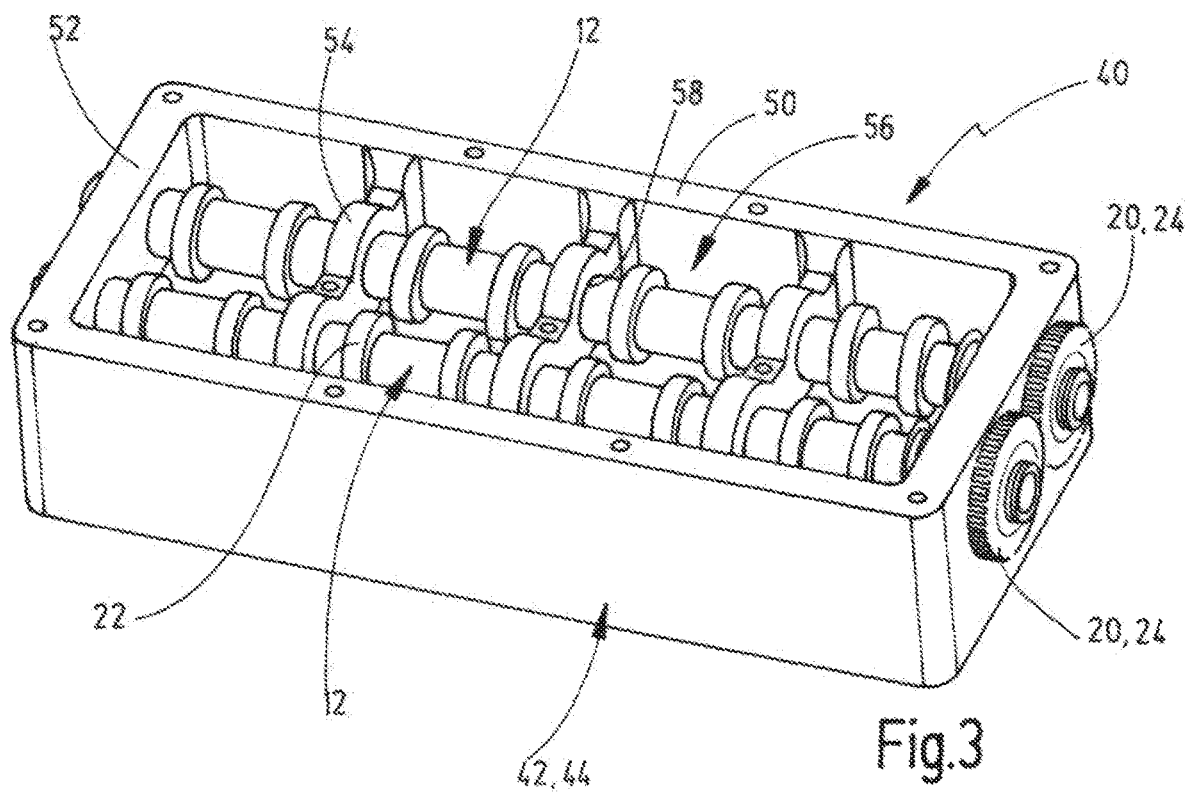
FIG. 3 is a perspective simplified view of a housing that is for instance arranged as a cam shaft housing, and that accommodates two cam shafts.

With reference to FIGS. 1, 2 and 3 an exemplary arrangement of an assembled shaft 10 which may be arranged as a cam shaft 12, for instance, will be elucidated. As already mentioned herein before, the shaft may also be referred to as composite shaft 10. In addition to cam shafts 12, also other shafts that may be used in combustion engines may be arranged as assembled composite shafts 10. Hereinafter, the unified term cam shaft 12 will be used, however, this shall not be construed to be limiting.

The cam shaft 12 comprises a pre-product which may also be referred to as support shaft 14. In some embodiments, the support shaft 14 may be arranged as a hollow shaft 16. The hollow shaft 16 is at least sectionally provided with a hollow profile 18, for instance continuously along its entire longitudinal extension. In the following, the term hollow shaft 16 will be used uniformly which is, however not to be construed to be limiting.

The cam shaft 12 is shown in FIG. 1 in an assembled, joined state, and in FIG. 2 in an exploded state. At the hollow shaft 16, a plurality of attachment parts 20 is arranged, refer to FIG. 1. The attachment parts 16 may involve, for instance, cams 22, gear wheels 24 (refer particularly to FIG. 3), sleeves 26, bearings or bearing rings 28, flanges 30 and such like. For a better understanding, in the following, primarily the term cams 22 will be used, even though the attachment parts 20 may basically involve also other components. At least some of the attachment parts 20, for instance the cams 22 and the gear wheels 24, have to be fixed to the hollow shaft 16 so tightly that a reliable torque transmission is enabled. A relative rotation between the cams 22 and/or the gear wheels 24 and their hollow shaft 16 has to be preempted with a high degree of certainty. The cams 22 comprise functional surfaces in the shape of circumferential running surfaces 32 that are commonly precision-machined.

It is basically known in the prior art to join cams 22 and similar attachment parts by means of so-called internal high pressure forming methods (hydroforming-methods) with hollow shafts 16 to form assembled cam shafts 12. In this context, reference is again made to US Publication No. 2003/0150095 and the procedure of the method basically described therein and the devices basically described therein.

Figure 4:
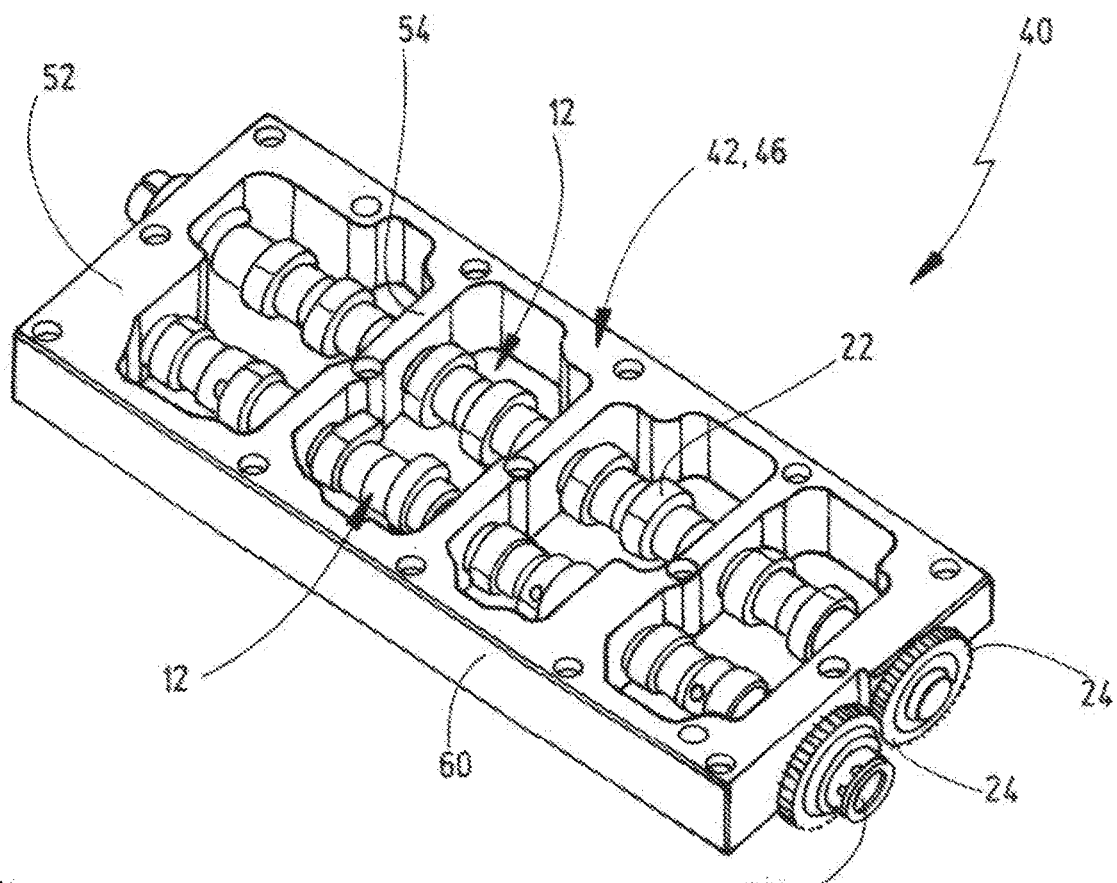
FIG. 4 is a simplified perspective view of a bearing frame at which two cam shafts are mounted.

A further trend in manufacturing technology, for instance for the manufacture of modular assemblies or functional modules for combustion engines relates to an integral manufacture, if possible, of housing components, frame structures and similar, to avoid thoughtful machining processes and/or assembly processes. In this context, by way of example, FIGS. 3 and 4 illustrate functional modules 40 that comprise integrally shaped frame structures 42. As used herein in the present disclosure, for instance a housing 44 (refer to FIG. 3), a bearing frame 46 (refer to FIG. 4 and FIG. 5) and similar structural elements for accommodating cam shafts 12 (generally of assembled composite shafts 10) shall be interpreted as frame structure 42.

Hence, in the following, for unification purposes, the term frame structure 42 will be used. The integral, particularly at least widely one-piece manufacture of the frame structure 42 may involve substantial effects. In some embodiments, compared to multi-part frame structures, joining procedures may be avoided. The joining of multi-part frame structures requires, on the one hand, respective joining operations and, on the other hand, a respective pre-processing of the joining surfaces. It is therefore a main advantage to form the frame structures 42 in one piece.

The frame structure 42 according to FIG. 3 that is arranged as a housing 44 comprises a housing wall 50, side bridges 52 and Intermediate bridges 54. Generally, the frame structure 42 defines at least one bearing channel 56, refer particularly to FIG. 5. The bearing channel 56 comprises a plurality of bearing seats 58 that are formed at the frame structure 42 and that are arranged concentrically with respect to one another. Bearing seats 58 are for instance formed in the side bridges 52 and in the intermediate bridges 54. FIG. 3 illustrates that the housing wall 50 of the housing 44 connects the side bridges 52 and the intermediate bridges 54 with one another. FIG. 4 illustrates that the side bridges 52 and the intermediate bridges 54 are connected to one another by longitudinal bridges 60. Both the housing 44 (FIG. 3) and the bearing frame 46 (FIG. 4) are formed in one piece, wherein also installed elements may be provided, for instance pressed-in sleeves, thread inserts, mating sleeves and such like.

Figure 5:
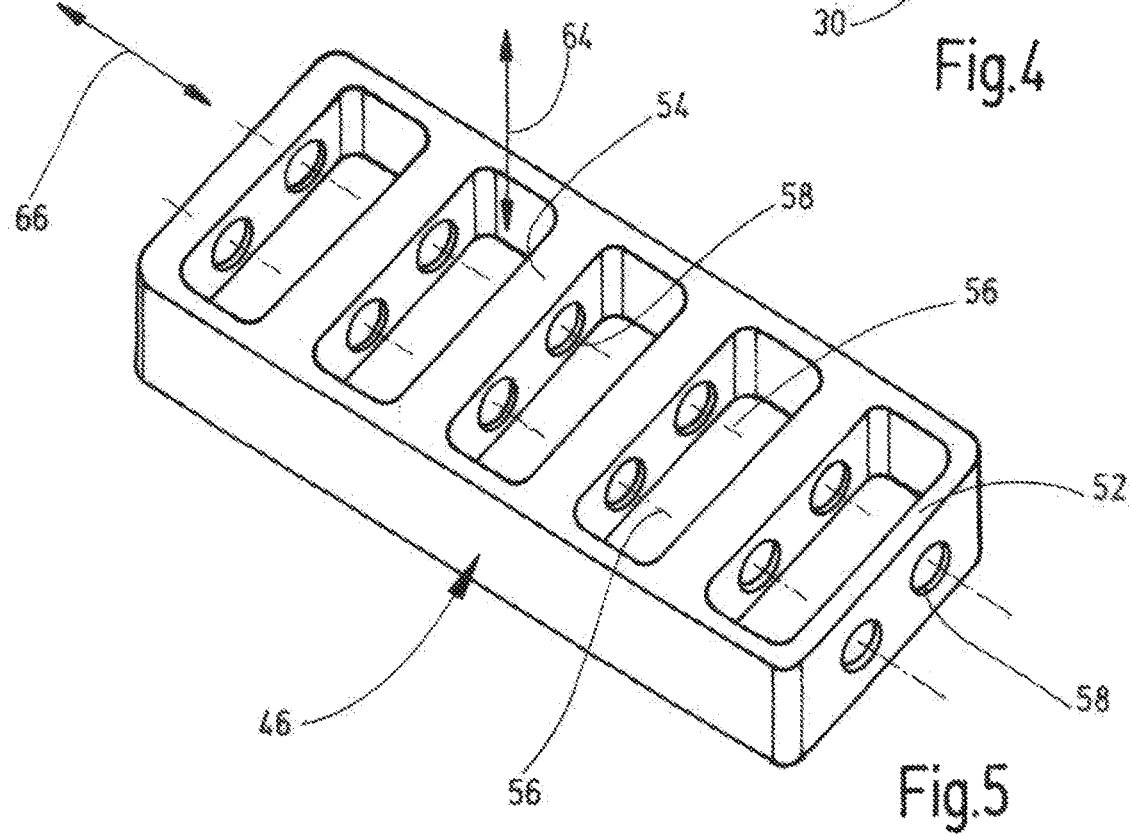
FIG. 5 is a perspective view of a bearing frame that is not equipped, based on the arrangement of the bearing frame according to FIG. 4.

In FIG. 5 there is further indicated by a double arrow designated by 64 a first direction or feeding direction which may also be referred to as radial feeding direction. Further, by means of a double arrow designated by 66, a second feeding direction is indicated which may also be referred to as axial feeding direction. The axial feeding direction 66 is generally parallel or concentric with respect to the longitudinal extension of the bearing channel 56 defined by the bearing seats 58. Generally, the radial feeding direction 64 is basically perpendicular to the bearing channel 56.

With particular reference to FIG. 2 and FIG. 5, further a feeding concept for the hollow shaft 16 and the attachment parts 20 to be attached at or on the hollow shaft 16 will be elucidated. In some embodiments, the cams 22 are in their radial extension (or their outline) greater than at least some of the bearing seats 58 of the bearing channel 56. This means in other words that respective cams 22 or a similar attachment part 20 can actually not just axially be inserted into the bearing channel 56 through the bearing seat 58. Hence, at least the cams 22 are fed towards the bearing channel 56 radially in the first feeding direction 64. The same may apply to at least some of the other attachment parts 20.

It is basically also conceivable that at least some of the attachment parts 20 are fed axially in the second feeding direction 66, for instance those bearings 28 that are mounted or pressed-in at the bearing seat 58 of the side bridges 52. Those bearings 28 that are mounted, for instance, between two cams 22 at the hollow shaft 16 are inserted, by way of example, by means of a combined movement involving first feeding in the first feeding direction 64 and, subsequently, in the second feeding direction 66 into a respective bearing seat 58 of an intermediate bridge 54.

The frame structures 42 illustrated in FIGS. 3 to 5 are not accessible for the hollow shaft 16 in the first feeding direction (radial feeding direction) 64. This is primarily caused by the fact that at least some of the bearing seats 58 are arranged as circumferential or closed bearing seats. In other words, the hollow shaft 16 may not be readily inserted radially through the intermediate bridges 54 or the side bridges 52 towards its desired end position in the bearing channel 56. Hence, the hollow shaft 16 has to be fed axially in the second feeding direction 66. An assembly of the cam shaft may therefore be formed just in the frame structure 42. The joint cam shaft 12 is accommodated in the finally assembled or joined state in the frame structure 42 in a loss-proof fashion and may not be disassembled or detached non-destructively.

An exemplary joining procedure for the cam shaft 12 will be illustrated and described in more detail hereinafter with reference to FIGS. 6 to 9.

Figure 6:
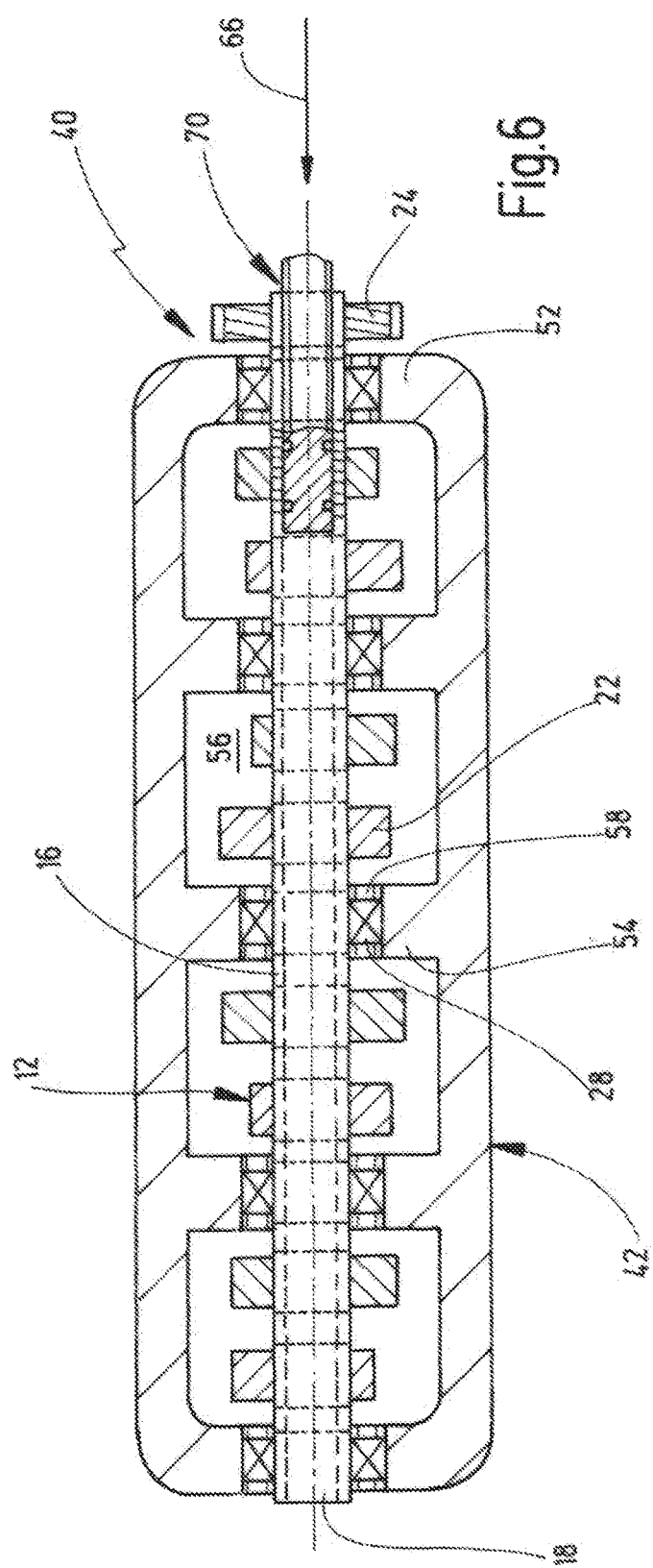
FIG. 6 is a simplified schematic plan of an assembled composite shaft that is arranged as a cam shaft, and that is mounted at a frame structure, during a joining procedure.

FIG. 6 shows a simplified cross-section through an at least pre-assembled cam shaft 12. The cam shaft 12 is inserted into a bearing channel 58 of a frame structure 42 and rotatably mounted by means of bearings 28 at respective bearing seats 58 of side bridges 52 and intermediate bridges 54. The cam shaft 12 comprises a hollow shaft 16 having a hollow profile 18 indicated by dashed lines, wherein a plurality of attachment parts 20, for instance cams 22 is mounted at the hollow shaft 16. The cam shaft 12 further comprises a sprocket or toothed wheel 24 that is disposed at one of the two ends of the hollow shaft 16. The cams 22 and the toothed wheel 24 are mounted at the hollow shaft 16 in a torque-proof fashion.

Figure 7:
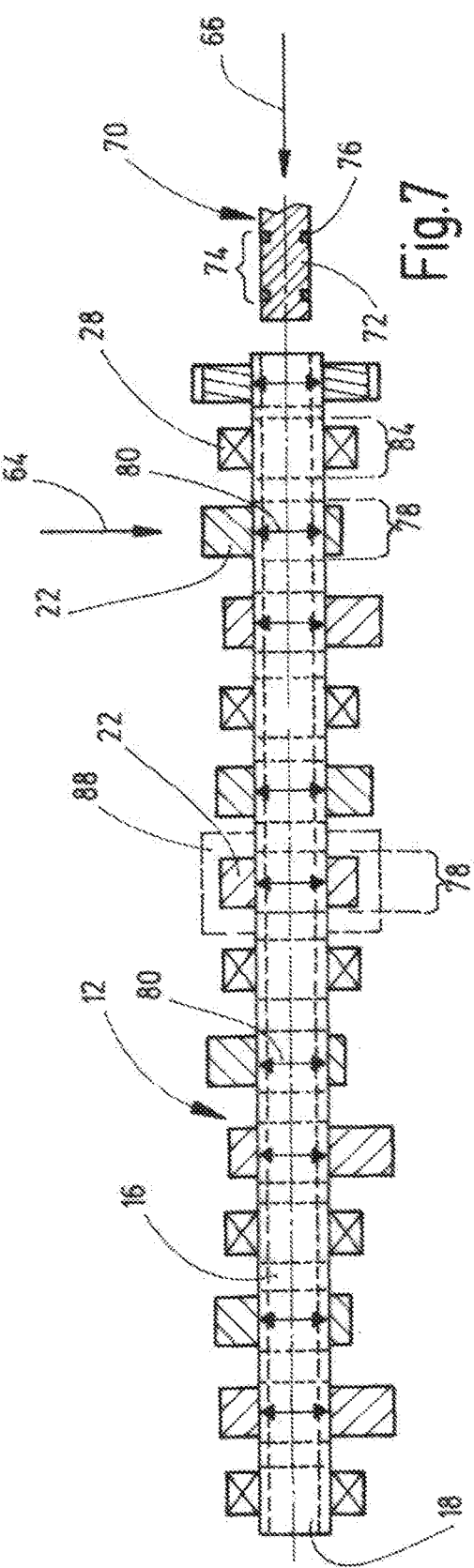
FIG. 7 is a side view of the cam shaft according to FIG. 6, wherein the illustration of the frame structure is omitted, and wherein a deformation state is shown in an out-of-engagement position.

FIG. 6 exemplarily illustrates an orientation in which the respective functional module 30 is viewed "from above" or "from the bottom". FIG. 7 shows a further schematic, greatly simplified longitudinal cross-section through the cam shaft 12 having an orientation that is rotated by 90° with respect to the orientation of FIG. 6. The view plane of FIG. 7 is perpendicular to the view plane of FIG. 6. In FIG. 7, for illustrative purposes, the frame structure 42 is omitted.

As already described herein before, a feeding or inserting of the hollow shaft 16 is performed in the axial feeding direction 66. However, before the hollow shaft 16 is inserted into the bearing channel 56, the attachment parts 20, for instance the cams 22, are respectively inserted into the bearing channel 56 so that the hollow shaft 16 may extend therethrough. The cams 22 may thus be basically inserted into the bearing channel radially in the first feeding direction 64 "from above", or "from the bottom", to be at least pre-joined or pre-assembled therein with the hollow shaft 16. A (final) joining of the hollow shaft 16 with the cams 22, the toothed wheel 24 or other attachment parts 20 is performed by widening, for instance. In some embodiments, the final joining is performed by a local widening of the hollow shaft 16, refer to double arrows in FIG. 7 that are designated by 80.

The widening may be for instance performed by means of a deformation tool 70 that is adapted to the hollow profile 18 of the hollow shaft 16. The deformation tool 70 comprises a mandrel 72 which may also be referred to as shaft or lance. The mandrel 72 comprises at least one deformation section 74, refer to FIG. 7, for instance. The deformation section 74 is generally (axially) delimited by a sealing arrangement 76. In this context, further reference is made to FIG. 9. By way of example, the at least one channel 82 for a fluid is formed in the deformation tool 70, wherein the fluid is supplied for widening the hollow shaft 16 with high pressure at the deformation section 74. The deformation section 74 is sealed by the sealing arrangement 76 to the exterior when the deformation tool 70 is respectively inserted into the hollow shaft 16. Accordingly, locally a very huge pressure may be applied sectionally and radially to the hollow shaft 16 to widen the same. Accordingly, a plastic deformation of the hollow shaft 16 may be induced.

In some embodiments, the widening of the hollow shaft 16 is respectively performed at least in support sections 78 that are associated with attachment parts 20, for instance with cams 22 or gear wheels 24. In this context, reference is made again to double arrows designated by 80 in FIG. 7 that indicate widened regions or regions to be widened of the hollow shaft 16. The hollow shaft 16 may further comprise so-called bearing sections 84 at which bearing 28 are mounted that do not necessarily have to be pressed-on with such a huge preload with the hollow shaft 16. Accordingly, in the bearing sections 84, it is not absolutely necessary to perform a respective widening of the hollow shaft 16 by the deformation tool 70. It is nevertheless conceivable that at least inner rings of a bearing 28 are fixed at or on the hollow shaft 16 by widening, for instance. It is also conceivable to form running surfaces for bearing 28 directly at the hollow shaft 16 so that bearing inner shells may be dispensed with.

It is basically also conceivable to form the deformation tool 70 in such a way that all support sections 78 are widened in one step. Accordingly, the mandrel or shaft 72 of the deformation tool 70 would have to be adapted to the overall extension of the hollow shaft 16 and the support sections 78 defined thereon, and would have to be provided with a plurality of deformation sections 74. It is however also conceivable to sequentially widen the support sections 78 piece by piece.

In FIG. 7 there is further indicated by 88 a positioning support for a cam 22. The positioning support is arranged to define a joining position of the cam 22 at a sufficiently high accuracy to ensure that the cam 22 is fixedly joined with the support section 78 in its desired position and orientation with respect to the hollow shaft 16 and/or to the remaining cams 22. The positioning support 88 may be associated with one cam 22, however but also with a plurality of cams 22. The positioning support 88 is primarily arranged to pre-define a rotation position or angular position of the cam. The positioning support 88 is, in certain embodiments, not intended to form a counterholder or die for the cam 22, when the cam 22 is fixed at the hollow shaft 16 by widening the respective support section 78. As the cam 22 does not have to be necessarily supported by a counterholder (a matrix, a die or such like), the running surface of the cam 22 is accessible for measurement equipment to monitor the widening and/or the joining procedure.

Figure 8:
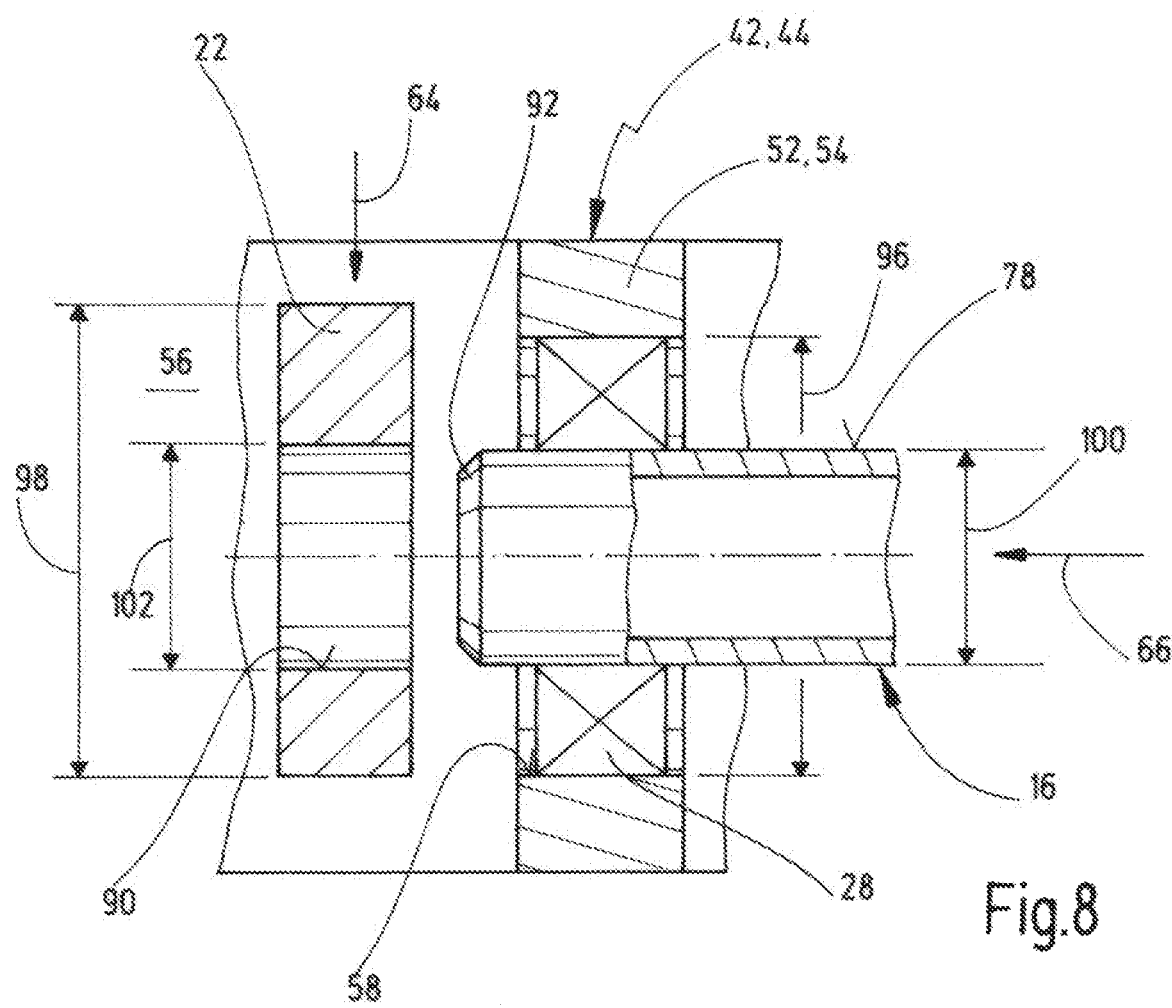
FIG. 8 is a simplified schematic partial view of a to-be-joint assembly of a hollow shaft and an attachment part in a non-joint state.
Figure 9:
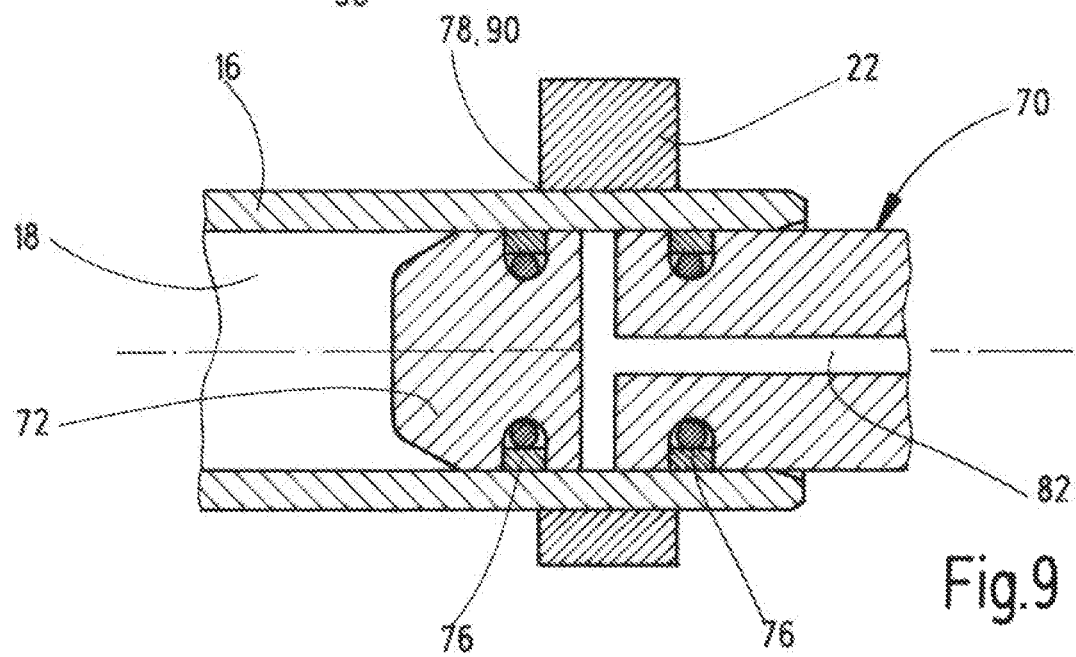
FIG. 9 is a cross-sectional view of a hollow shaft that is to be joined with an attachment part, similar to the view of FIG. 8, wherein a deformation tool is inserted into the hollow shaft to widen a support section of the hollow shaft.

FIG. 8 shows a detailed view of the hollow shaft 16 being inserted or threaded into the frame structure 42. The feeding is performed axially, refer to the second feeding direction 66. Accordingly, the hollow shaft 16 may be guided at its first end, where for instance a tapering 92 is formed, through a bearing 28 that is mounted at a bearing seat 58 of a side bridge or intermediate bridge 54. FIG. 8 further shows a cam 22 that comprises a maximum dimension 98 that is greater than an inner diameter 96 of the bearing seat 58. Accordingly, the cam 22 may not be axially fed in the second feeding direction 66 through the bearing seat 58. Instead, the cam 22 is radially fed in the first feeding direction 64 towards the bearing channel 56.

In some embodiments, the joining procedure between the hollow shaft 16 and the attachment parts to be fixed thereon is not just performed by thermal joining exploiting the thermal expansion of the hollow shaft 16 and/or the attachment parts 20. In some embodiments, the widening of the support section 78 for joining the support section 78 with the mounting seat 90 of the attachment part 20 or cam 22 is performed without using a die or a respective counterholder at the outer circumference of the attachment parts 20 or cam 22. As the assembly play (outer diameter 100-inner diameter 102) is just very small, only a small widening of the hollow shaft 16 is required to ensure a sufficiently fixed mounting of the attachment part 20. In some embodiments, this is performed with only small form changes and/or shape changes at the outer circumference of the attachment part 20 or cam 22. Accordingly, an effortful fixation by means of a matrix or a respectively arranged counterholder (also: die) may be dispensed with.

In some embodiments, for a pre-assembling of the hollow shaft 16, an inner diameter 102 of the mounting seat 90 is at least slightly larger than an outer diameter 100 of the hollow shaft 16, for instance of the support section 78 that is associated with the mounting seat 90. In some embodiments, the resulting assembly play is nevertheless as small as possible. In this way, already a relatively small widening of the hollow shaft 16 may namely ensure a sufficiently tight fit of the cam 22 at the support section 78.

With reference to FIGS. 10, 11, 12 and 13, an illustrative assembly procedure for joining a cam shaft 12 in a frame structure and/or a housing 44 is elucidated. The housing 44 is, for illustrative purposes, merely indicated as a block. Further, again for illustrative purposes, in FIGS. 11, 12 and 13 the block representation of the housing 44 is omitted.

FIG. 10 elucidates a state in which attachment parts, for instance cams 22 are already fed to the housing 44 and oriented therein in positioning supports 88, for instance. This is not explicitly shown in FIG. 10. Now, a hollow shaft 16 may be axially (laterally) inserted, and may extend through the mounting seats 90 of the cams 22, refer in this context also to an arrow designated by 104 for illustrating an axial assembly direction, refer also to the illustration in FIG. 8. By way of example, the cam shaft 12 to be joined comprises in total four pairs of cams. FIG. 11 shows that the cams 22 are oriented by means of positioning supports 88 in such a way that their mounting seats 90 are aligned to be joined with the hollow shaft 16. A separate positioning support 88-1, 88-2, 88-3 and 88-4 is associated with each of the pairs of cams.

Positioning support 88-1 is associated with a first pair of cams, positioning support 88-2 is associated with a second pair of cams, positioning support 88-3 is associated with a third pair of cams and positioning support 88-4 is associated with a fourth pair of cams. It goes without saying that also only a single positioning support 88 may be provided that respectively aligns all pairs of cams.

In addition to the aligned orientation, the positioning supports 88-1, 88-2, 88-3 and 88-4 effectuate a defined angular orientation of any cams 22 of the pairs of cams. It can be seen in particular with reference to FIGS. 10 and 11 that this may initially involve a similar angular orientation of any cams 22 or pairs of cams. This orientation does not correspond to the desired relative orientation of the cams 22 in the finally joined state. The joining of the hollow shaft 16 with the cams 22 is performed by sectionally plastically widening the hollow shaft hollow shaft 16, refer also to FIG. 9, as already described herein before. To this end, a deformation tool 70 is inserted into the hollow shaft 16.

At the transition between this states according to FIG. 11 and FIG. 12, already the first pair of cams that was oriented before by the positioning support 88-1 is already pressed-in or fixed with the hollow shaft 16 in a torsionally rigid fashion by sectionally widening the hollow shaft 16. This may be performed in the aligned orientation in the positioning support 88-1 as shown in FIG. 11, for instance, when the hollow shaft 16 is respectively positioned. Before the hollow shaft 16 is then joined with the second pair of cams that is oriented by the positioning support 88-2, now an angular orientation of the hollow shaft 16 with respect to the second pair of cams is performed to effectuate the desired orientation between the first pair of cams and the second pair of cams. This is achieved by means of a defined rotation of the hollow shaft, refer also to a curved arrow designated by 106 in FIG. 12. Subsequently, the second pair of cams may be joined by sectionally widening the hollow shaft 16.

FIG. 13 indicates that similarly the third pair of cams may be joined that is in FIG. 12 still oriented by means of the positioning support 88-3. Accordingly, again a defined orientation of the hollow shaft 16 to effectuate the desired angular orientation between the third pair of cams and the already joined pairs of cams takes place. Similarly, also the fourth pair of cams may be joined. Overall, a sequential assembly procedure is present that comprises a repeated sequence of orientating and joining.

It goes without saying that the sequential assembly procedure illustrated with reference to FIGS. 10 to 13 may be also applied to each single attachment part 20, for instance to each single cam 22. Accordingly, each cam 22, also each cam of each pair of cams, may be separately (mediately) oriented by rotating the hollow shaft 16, and may be joined by sectionally widening the hollow shaft 16. This embodiment has the further advantage over the embodiment illustrated with reference to FIGS. 10 to 13 that the positioning support 88 and/or components thereof may be designed even more simple. Further, there may be the effect that respectively only a very small axial section of the hollow shaft 16 has to be widened, refer to the support section 78 in FIG. 6.

Figure 14:
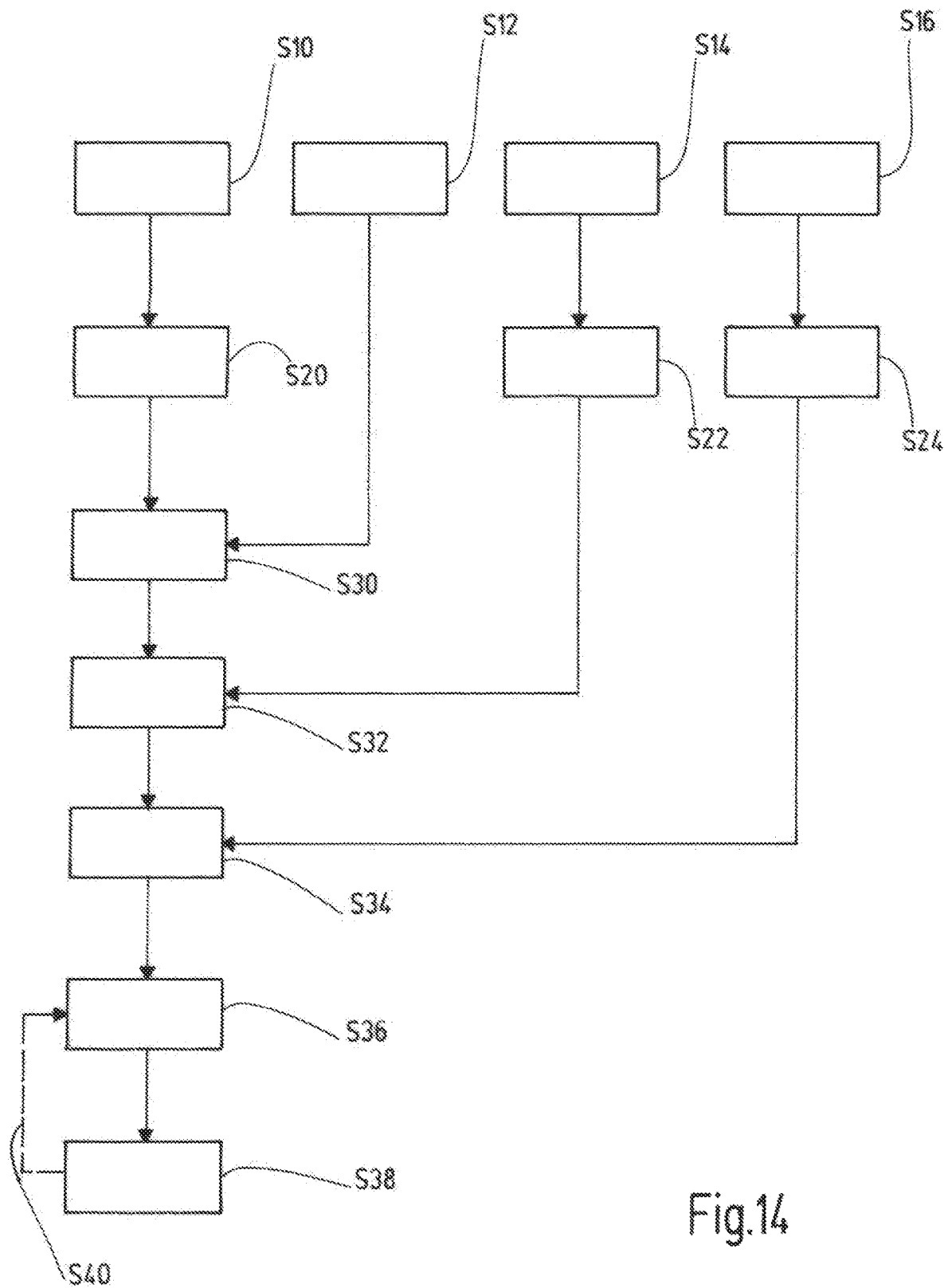
FIG. 14 is a schematic block view of an exemplary arrangement of a method for joining a functional module in accordance with at least some principles of the present disclosure.

FIG. 14 shows a greatly simplified schematic block diagram of a conceivable sequence of an assembly procedure that utilizes at least some aspects of the present disclosure. It goes without saying that the method may involve optional steps, and that further supplements of the method by further steps or alternative steps are conceivable without departing from fundamental main aspects of the disclosure.

The method may involve different provision steps S10, S12, S14, and S16. The step S10 involves the provision of a frame structure, for instance of a frame structure that forms a closed bearing channel. The frame structure may also be arranged as a housing or a bearing frame. In some embodiments, the frame structure may involve a housing of frame component that is formed in one piece and that defines a bearing channel having a plurality of bearing seats that are formed to be circumferentially closed.

The step S12 may involve the provision of at least one bearing, for instance of at least one roller bearing and/or slide bearing. Generally, cam shafts and similar assembled shafts are mounted by means of a plurality of bearings at the frame structure.

The step S14 may involve the provision of attachment parts that form an assembled composite shaft together with a pre-product (also support shaft) that is arranged as a hollow shaft. The attachment parts may be arranged, for instance, as cams, gear wheels, sprockets, flanges and similar components. In some embodiments, at least some of the components are arranged to be attached to the hollow shaft in a torsionally rigid fashion for rotary driving.

The step S16 may thus involve the provision of a pre-product which may also be referred to as support shaft. In some embodiments, step S16 comprises a provision of a hollow shaft that is provided with a hollow profile. The hollow shaft may be for instance tubular. The hollow shaft may also comprise stepped sections.

Subsequent to the provision steps S10, S14, and S16, machining steps S20, S22, S24 may follow. The step S20 may involve machining at least one bearing seat of the bearing channel defined by the frame structure. In this way, an appropriate seat for the bearing(s) provided in the step S12 may be formed at the frame structure.

The step S22 may involve machining at least one mounting seat of an attachment part. The step S24 may involve machining at least one support section at the hollow shaft and/or the support shaft.

Ideally, the steps S22 and S24 are adapted to one another so that for instance an inner diameter that is manufactured in the step S22 is adapted to an outer diameter that is formed in the step S24. Ideally, the inner diameter and outer diameter formed in the steps S22, S24 are adapted to one another in such a way that, at room temperature, a simple joining (threading in) of the support shaft through the mounting seat of the attachment part is enabled. In a step S24, the entire support shaft may be machined. It is, however, also conceivable that the support shaft is only sectionally machined in the region of its support sections. In some embodiments, the assembly play that is formed in the steps S22 and S24 is minimized in such a way that already a slight widening of the support shaft in a subsequent step may form a rigid, for instance a torque-proof joint between the support shaft and the attachment parts.

A first joining step S30 may follow that involves equipping the frame structure with the bearings provided in the step S12.

A further step S32 may follow that may for instance involve a feeding of the attachment parts provided in the step S14 into the bearing channel of the frame structure. This may for instance involve a defined (rough-) orientation and a (rough-) positioning of the attachment parts. Ideally, the supplied attachment parts are oriented in their mounting seats aligned with the bearing seats of the bearing channel. At least some of the attachment parts are radially fed.

In accordance with one embodiment, step S32 involves an alignment of at least some of the attachment parts. This may involve, on the one hand, an alignment of some or all attachment parts in their desired relative position with respect to one another that they should also have in the final state. By way of example, cams of cam shafts have to be angularly positioned with respect to one another with high precision to achieve the desired controlled timing of the valve drive. This relates on the one hand to the relative position between inlet and outlet cams of a pair of cams, but also relates to the orientation among the pairs of cams.

On the other hand, it is conceivable in accordance with an alternative embodiment to indeed define the attachment parts in a defined fashion, but deliberately not in their final relative position with respect to one another. This may involve that the attachment parts, for instance all cams or at least a subset of the cams, are oriented in a common angular position, for instance at a common positioning support.

As an intermediate step it is conceivable to orient inlet cams and outlet cams of each pair of cams of a plurality of cams already in the step S32 defined with respect to one another, for instance in a common positioning support that defines a desired angular offset. The desired final relative position between the single pairs of cams, however, would be not adjusted in the step S32 with high precision then. Rather, the pairs of cams could be orientated in a common angular position that deviates from the desired final orientation with respect to one another.

A step S34 may follow that involves supplying, for instance axially supplying the support shaft. Accordingly, the support shaft may be guided through the bearings, for instance through the inner diameter thereof, and through the attachment parts, for instance through the mounting seats thereof, to assume its target-position in the frame structure.

In a further step S36 that may basically form a part of the steps S32 and S34, an orientation adjustment of the support shaft and of the attachment parts to be attached thereto is performed. This may involve an axial orientation, but also a rotation orientation. In some embodiments, when the attachment parts involve a plurality of cams, a respective relative position of the cams (angular position) is of great significance. Hence, this may be effectuated in the step S36 for instance by means of gages or similar positioning supports, but, depending on the embodiment, also already in the step S32, at least in part.

A joining step S38 may follow that involves a sectional widening of the support shaft, for instance. This may be for instance effectuated by means of a deformation tool, for instance a mandrel-shaped or shaft-shaped deformation tool that is arranged to apply a pressure to the support shaft from the interior that the support shaft is at least sectionally widened. In this way, a high-strength joint, for instance a torsionally rigid joint between the support shaft and at least some of the attachment parts may be formed.

A dashed arrow designated by S40 indicates that the steps S36 and S38 alternatively may be repeatedly executed, for instance sequentially. In accordance with this embodiment the position adjusting and the joining by widening the support shaft are thus sequentially performed. The step S36 may involve in a first execution, the desired axial positioning of the support shaft, hence also the overall insertion of the support shaft.

In the first execution, the step S36 may further involve an adjustment of the angular position between the support shaft and a first attachment part (for instance a first cam). A first execution of the steps S38 may follow, wherein a section of the support shaft is plastically widened and hence a rigid joint between the support shaft and the first attachment part is formed.

A further execution of the steps S36 and S38 may thus involve a further adjustment of the angular position between the support shaft and a further attachment part. In other words, the first attachment part that is already fixed at the support shaft is rotated together with the support shaft with respect to the next attachment part to effectuate the desired relative angular orientation between the attachment parts (for instance the cams).

The steps S36 and S38 may be repeated until any attachment parts are fixed to the support shaft in the desired relative (angular) position. At each execution, the support shaft may be respectively rotated. Further, the deformation tool may be axially moved at each execution of the steps S36 and S38 to widen a further section of the support shaft.

The sequential joining may require once again a position adjustment and a widening. In the alternative, it is also conceivable, for instance with pairs of cams involving inlet cams and outlet cams, to jointly join a subset (e.g. two) of the attachment parts and, respectively, to orientate the support shaft with respect to this subset beforehand. This may require a pre-alignment (relative alignment) of the attachment parts of the subset with respect to one another.

Ideally, at least the pre-assembly and the final joining of the attachment parts and the support shaft are performed without exploiting the thermal expansion of the used materials.

In some embodiments, the method is substantially finished at the step S38 and/or subsequent to the sequential executing of the steps S36 and S38. This involves that no post-processing at the support shaft and the attachment parts attached thereto is necessary, as least in some embodiments. In some embodiments, the joining is performed at high precision so that no post-processing of revolving circumferential surfaces of the cams is necessary.

In accordance with alternative embodiments, the method according to FIG. 14 may be modified. Further, the subject-matter of the disclosure also covers a method for joining an assembled composite shaft that does not necessarily have the step S10 and/or the step S20 as an upstream step. Rather, the feeding, aligning and joining of the hollow shaft and the attachment parts, for instance in accordance with the steps S30 to S40, may also be performed on the outside of a frame structure that involves a bearing channel. Also in the context of this embodiment, several effects may be achieved, in for instance in regard of the reduction and/or prevention of a post-processing and/or finishing processing. In this way, for instance cam shafts and similar composite shafts may be formed wherein bearings and/or similar attachment parts are attached and/or or at least partially integrated.

What is claimed is:

1. A method of manufacturing a functional module comprising a frame structure that defines a bearing channel and an assembled composite shaft that comprises a hollow shaft and a plurality of attachment parts that are fixed thereto in a torque-proof manner, wherein the composite shaft is mounted at the frame structure, wherein the method comprises:

providing the frame structure that is arranged as one of a bearing frame and a housing, and that defines the bearing channel having at least one circumferentially closed bearing seat, providing at least two of the plurality of attachment parts, providing the hollow shaft that comprises at least two support sections disposed along a length of the hollow shaft, wherein each attachment part of the at least two attachment parts comprises a mounting seat that is adapted to a respective support section of the at least two support sections, feeding the at least two attachment parts in the bearing channel in a first feeding direction, wherein the feeding includes aligning the at least two attachment parts, wherein the at least two attachment parts are arranged in a target joining orientation that determines a relative orientation of the at least two attachment parts with respect to one another that deviates from a target orientation of the attachment parts to one another when fixed, feeding the hollow shaft in the bearing channel in a second feeding direction that is different from the first feeding direction, wherein the hollow shaft is inserted in the mounting seats of the at least two attachment parts, subsequent to the feeding of the hollow shaft in the bearing channel;

axially positioning the hollow shaft, adjusting an angular position of the hollow shaft relative to a first attachment part of the at least two attachment parts that is at a first final joining location along the length of the hollow shaft and is aligned with a first support section of the at least two support sections that is at the first final joining location, sectionally widening the hollow shaft at the first support section causing the first support section to radially deform into contact with the first attachment part fixing the first attachment pa to the hollow shalt in a torsionally rigid manner, wherein subsequent to sectionally widening the hollow shaft at the first support section the method further comprises:

adjusting the angular position of the hollow shaft relative to a second attachment pan of the at least two attachment parts that is at a second final joining location along the length of the hollow shaft and is aligned with a second support section of the support sections that is at the second final joining location, widening the hollow shaft at the second support section causing the second support section to radially deform into contact with the second attachment art fixing the second attachment part to the hollow shaft in a torsionally rigid manner, wherein adjusting and widening the hollow shaft associated with the second support section after adjusting and widening the hollow shaft associated with the first support section allows a desired relative angular orientation between the first attachment pan and the second attachment part to be achieved, aligning the at least two attachment parts with the at least two support sections such that each attachment part is positioned at a respective final joining location along the length of the hollow shaft, and subsequent to aligning the attachment parts and while each attachment part is positioned at the respective final joining location, at least sectionally widening the hollow shaft at the at least two support sections causing the at least two support sections to radially deform into contact with the mounting seats of the at least two attachment parts fixing each attachment part of the at least two attachment parts at the respective final joining location in a torsionally rigid manner, wherein the hollow shaft is plastically deformed in a region of the respective support sections through the at least sectionally widening of the hollow shaft, and wherein the at least two attachment parts are elastically deformed through the at least two support sections radially deforming into contact with the mounting seats of the at least two attachment parts.

2. The method as claimed in claim 1, further comprising, prior to the feeding of the at least two attachment parts and the hollow shaft, machining at least one of the respective support sections of the hollow shaft and a respective mounting seat of one attachment part of the plurality of attachment parts for forming a defined assembly clearance between the hollow shaft and the one attachment part.

3. The method as claimed in claim 2, farther comprising, prior to the feeding the hollow shaft, finishing machining at least one bearing section of the hollow shaft that is mounted to one of the at least one circumferentially closed bearing seats in the bearing channel in an assembled state.

4. The method as claimed in claim 3, further comprising assembling at least one bearing element that enables a relative rotation between the hollow shaft and the frame structure, comprising arranging the at least one bearing element between a corresponding bearing section of the hollow shaft and a corresponding bearing seat of the bearing channel.

5. The method as claimed in claim 1, wherein at least sectionally widening the hollow shaft further comprises:

inserting a lance shaped or mandrel shaped deformation tool into the hollow shaft, and sequentially or simultaneously widening the at least two support sections of the hollow shaft, that are associated with respective attachment parts to be joined.

6. The method as claimed in claim 5, wherein the widening of at least one of the at least two support sections is performed without counter-holding by means of an outer die.

7. The method as claimed in claim 1, wherein the at least two attachment parts that are elastically deformed, subsequent to the widening of the hollow shaft, comprise a final contour having an outer circumference having an actual dimension that corresponds to a functionally specified target dimension of the outer circumference.

8. The method as claimed in claim 1, wherein, subsequent to the widening of the hollow shaft, a final contour that is free from post-processing is present at the at least two attachment parts.

9. The method as claimed in claim 1, wherein the at least two attachment parts, prior to the widening of the hollow shaft, comprise an outer contour that is smaller than a functionally specified target outer contour, and wherein the at least two attachment parts, subsequent to the widening of the hollow shaft, comprise an actual outer contour that corresponds to the functionally specified target outer contour.

10. The method as claimed in claim 1, wherein at least some of the at least two attachment parts, prior to the widening of the hollow shaft, are provided, on an outer contour, with functional surfaces that are arranged as finished circumferential running surfaces.

11. The method as claimed in claim 1, wherein the at least two attachment parts, prior to the widening of the hollow shaft, are finished at on an outer contour by a material removing machining processes, and provided with a shape that is defined in consideration of the elastic deformation that remains subsequent to the widening of the hollow shat.

12. The method as claimed in claim 1, wherein the functional module is formed as an engine module, wherein the composite shaft is arranged as one of a control shaft and a cam shaft, and wherein the at least two attachment parts are selected from the group consisting of cams, flanges, bearing bushings, pulse generators, gear wheels, spacer sleeves, and sprockets.

13. A method of manufacturing a camshaft module comprising a housing that defines a bearing channel, and an assembled composite shaft that comprises a hollow shaft and a plurality of cams that are fixed thereto in a torque-proof manner, wherein the composite shaft is mounted to the housing, wherein the method comprises:

providing the housing that defines the bearing channel having at least one circumferentially closed bearing seat, providing the plurality of cams, providing the hollow shaft that comprises a plurality of support sections disposed along a length of the hollow shaft, wherein each cam of the plurality of cams comprises a mounting seat that is adapted to a respective support section of the plurality of support sections, feeding the plurality of cams in the bearing channel in a first feeding direction, wherein the feeding includes aligning the plurality of cams, wherein the plurality of cams are arranged in a target joining orientation that determines a relative orientation of the plurality of cams with respect to one another that deviates from a target orientation of the plurality of cams to one another when fixed, feeding the hollow shaft in the bearing channel in a second feeding direction that is different from the first feeding direction, wherein the hollow shaft is inserted in the mounting seats of the plurality of cams, subsequent to the feeding of the hollow shaft in the bearing channel:

axially positioning the hollow shaft, adjusting an angular position of the hollow shaft relative to a first cam of the plurality of cams that is at a first final joining location along the length of the hollow shaft and is aligned with a first support section of the at least two support sections that is at the first final joining location, sectionally widening the hollow shaft at the first support section causing the first support section to radially deform into contact with the first attachment pan fixing the first attachment part to the hollow shaft in a torsionally rigid manner, wherein subsequent to sectionally widening the hollow shalt at the first support section the method further comprises:

adjusting the angular position of the hollow shaft relative to a second cam of the plurality of cams that is at a second final joining location along the length of the hollow shaft and is aligned with a second support section of the support sections that is at the second final joining location, widening the hollow shaft at the second support section causing the second support section to radially deform into contact with the second cam fixing the second cam to the hollow shaft in a torsionally rigid manner, wherein adjusting and widening the hollow shaft associated with the second support section after adjusting and widening the hollow shaft associated with the first support section allows a desired relative angular orientation between the first cam and the second attachment part to be achieved, aligning the plurality of cams with the plurality of support sections such that each cam is positioned at a respective final joining location along the length of the hollow shaft, and subsequent to aligning the plurality of cams and while each cam is positioned at the respective final joining location, at least sectionally widening the hollow shaft at the plurality of support sections causing the plurality of support sections to radially deform into contact with the mounting seats of the plurality of cams fixing each cam of the plurality of cams at the respective final joining location in a torsionally rigid manner, wherein the hollow shaft is plastically deformed in a region of the support sections through the at least sectionally widening of the hollow shaft, and wherein the plurality of cams are elastically deformed through the plurality of support sections radially deforming into contact with the mounting seats of the plurality of cams.

14. The method as claimed in claim 13, wherein the plurality of cams, prior to the widening of the hollow shaft, are finished at an outer contour by a material removing machining processes and provided with a shape that is defined in consideration of the elastic deformation that remains subsequent to the widening of the hollow shaft.

15. The method as claimed in claim 1, further comprising:

feeding an attachment part in the bearing channel in the first feeding direction, feeding the hollow shaft in the bearing channel through a mounting seat of the attachment part in the second feeding direction, aligning the attachment part at a location along the length of the hollow shaft where a particular support section of the plurality of support sections is located, and widening the hollow shaft at the particular support section causing the particular support section to radially deform into contact with the mounting seat of the attachment part fixing the attachment part at the location in a torsionally rigid manner, wherein the hollow shaft is plastically deformed in a portion of the particular support section through widening the hollow shaft, and wherein the particular support section is elastically deformed through the particular support section radially deforming into contact with the mounting sat of the particular support section.

16. The method as claimed in claim 15, wherein widening the hollow shaft comprises hydroforming, and wherein the attachment part comprises one of a bearing, bearing ring, sleeve, gear wheel, and flange.

* * * * *